US012452084B2

(12) United States Patent
Behnia et al.

(10) Patent No.: US 12,452,084 B2
(45) Date of Patent: Oct. 21, 2025

(54) LIGHTWEIGHT POST-QUANTUM AUTHENTICATION

(71) Applicant: UNIVERSITY OF SOUTH FLORIDA, Tampa, FL (US)

(72) Inventors: Rouzbeh Behnia, Tampa, FL (US); Attila Altay Yavuz, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 302 days.

(21) Appl. No.: 17/739,036

(22) Filed: May 6, 2022

(65) Prior Publication Data
US 2022/0385484 A1 Dec. 1, 2022

Related U.S. Application Data

(60) Provisional application No. 63/185,205, filed on May 6, 2021.

(51) Int. Cl.
*H04L 9/00* (2022.01)
*H04L 9/08* (2006.01)
*H04L 9/32* (2006.01)

(52) U.S. Cl.
CPC .......... *H04L 9/3268* (2013.01); *H04L 9/0869* (2013.01); *H04L 9/321* (2013.01); *H04L 9/3236* (2013.01)

(58) Field of Classification Search
CPC ..... H04L 9/3268; H04L 9/0869; H04L 9/321; H04L 9/3236
USPC ........................................................ 713/156
See application file for complete search history.

(56) References Cited

U.S. PATENT DOCUMENTS

| 9,673,975 | B1* | 6/2017 | Machani | ............... H04L 9/0822 |
| 9,954,680 | B1* | 4/2018 | Machani | ............... H04L 9/0825 |
| 10,511,441 | B2 | 12/2019 | Maximov et al. | |
| 10,511,447 | B1 | 12/2019 | Lakk | |

(Continued)

OTHER PUBLICATIONS

Abdalla et al., "A New Forward-Secure Digital Signature Scheme," in Advances in Cryptology—Asiacrypt 2000, T. Okamoto, Ed. Berlin, Heidelberg:Springer Berlin Heidelberg, 2000, pp. 116-129.

(Continued)

*Primary Examiner* — Thanh T Le
(74) *Attorney, Agent, or Firm* — HUSCH BLACKWELL LLP

(57) ABSTRACT

A method, system, or apparatus for generating and/or verifying a signature on a message is provided. The method, system, or apparatus at a signer may include receiving a message, generating a security parameter, generating at least two seeds corresponding to at least two servers based on the security parameter, transmitting the at least two seeds to each server of the at least two servers, determine a private key based on the security parameter or the at least two seeds, and generating, on the message, a signature based on the private key. The method, system, or apparatus at a verifier may include receiving, from a signer, a signature on a message, obtaining at least two partial public keys, determining a full public key based on the at least two partial public keys, and authenticating the signature on the message based on the full public key. Other aspects, embodiments, and features are also claimed and described.

18 Claims, 8 Drawing Sheets

(56) References Cited

U.S. PATENT DOCUMENTS

| | | | | |
|---|---|---|---|---|
| 11,588,645 | B1* | 2/2023 | Yavuz | H04L 9/14 |
| 11,736,283 | B2* | 8/2023 | Nix | H04W 4/70 |
| | | | | 713/168 |
| 11,777,719 | B2* | 10/2023 | Nix | H04L 9/0852 |
| | | | | 713/171 |
| 2004/0218763 | A1* | 11/2004 | Rose | H04L 9/3247 |
| | | | | 380/277 |
| 2005/0010758 | A1* | 1/2005 | Landrock | H04L 63/126 |
| | | | | 713/156 |
| 2005/0149730 | A1* | 7/2005 | Aissi | H04L 9/3247 |
| | | | | 713/168 |
| 2007/0104322 | A1* | 5/2007 | Ding | H04L 9/3073 |
| | | | | 380/28 |
| 2009/0106560 | A1* | 4/2009 | Chopart | G06F 21/64 |
| | | | | 713/189 |
| 2013/0046973 | A1* | 2/2013 | Resch | H04L 9/0869 |
| | | | | 713/156 |
| 2013/0191632 | A1* | 7/2013 | Spector | H04L 9/085 |
| | | | | 713/155 |
| 2014/0250303 | A1* | 9/2014 | Miller | G06F 21/602 |
| | | | | 713/171 |
| 2015/0121066 | A1* | 4/2015 | Nix | H04L 63/123 |
| | | | | 713/155 |
| 2015/0363775 | A1* | 12/2015 | Li | H04L 9/321 |
| | | | | 705/71 |
| 2019/0007205 | A1* | 1/2019 | Corduan | H04L 9/0825 |
| 2019/0114401 | A1* | 4/2019 | De | G06F 21/64 |
| 2019/0319801 | A1 | 10/2019 | Sastry et al. | |
| 2019/0342080 | A1* | 11/2019 | Vakili | H04L 63/06 |
| 2019/0354972 | A1* | 11/2019 | Di Nicola | G06Q 20/3825 |
| 2020/0119908 | A1* | 4/2020 | Christensen | H04L 9/3252 |
| 2020/0380503 | A1* | 12/2020 | Prokop | G06Q 20/12 |
| 2021/0051003 | A1* | 2/2021 | Jarjoui | G06Q 20/3825 |
| 2021/0075600 | A1* | 3/2021 | Trevethan | H04L 9/3066 |
| 2023/0111741 | A1* | 4/2023 | Ho | H04L 9/3265 |
| | | | | 713/157 |
| 2023/0163948 | A1* | 5/2023 | Trevethan | H04L 9/3297 |
| | | | | 380/255 |
| 2023/0299981 | A1* | 9/2023 | Zacher | H04L 9/3273 |
| | | | | 713/169 |
| 2023/0318851 | A1* | 10/2023 | Kojima | H04L 9/3255 |
| | | | | 713/176 |

OTHER PUBLICATIONS

Atkins, "Requirements for post-quantum cryptography on embedded devices in the iot." NIST, Computer Security Resource Center 2021, 4 pages.

Aumasson et al., "Sha-3 proposal blake," Submission to NIST (Round 3), 2010. [Online]. Available: http://131002.net/blake/blake.pdf, 8 pages. Downloaded Sep. 13, 2022.

Behnia et al., "Towards Practical Post-quantum Signatures for Resource-Limited Internet of Things." Annual Computer Security Applications Conference. 2021. (pp. 119-130).

Bellare et al., "The Security of Triple Encryption and a Framework for Code-Based Game-Playing Proofs," in Advances in Cryptology—Eurocrypt2006, S. Vaudenay, Ed. Springer Berlin Heidelberg, 2006, pp. 409-426.

Bernstein et al., "SPHINCS: Practical Stateless Hash-Based Signatures," in Advances in Cryptology—Eurocrypt 2015: 34th Annual International Conference on the Theory and Applications of Cryptographic Techniques. Springer Berlin Heidelberg, Apr. 2015, pp. 368-397.

Bernstein et al., "The SPHINCS+ Signature Framework," in Proceedings of the 2019 ACMSIGSAC Conference on Computer and Communications Security, ser. CCS '19. NewYork, NY, USA: Association for Computing Machinery, 2019, p. 2129-2146.

Bernstein, "New stream cipher designs," M. Robshaw and O. Billet, Eds.Berlin, Heidelberg: Springer-Verlag, 2008, ch. The Salsa20 Family of StreamCiphers, pp. 84-97.

Bos et al., "Rapidly verifiable xmss signatures," IACR Transactions on Cryptographic Hardware and Embedded Systems, pp. 137-168, 2021.

Boyko et al., "Speeding up discrete log and factoring based schemes via precomputations," in Advances in Cryptology—Eurocrypt' 98: International Conference on the Theory and Application of Cryptographic Techniques Espoo, Finland, May 31-Jun. 4, 1998 Proceedings. Springer Berlin Heidelberg, 1998, pp. 221-235.

Bruinderink, "Flush, Gauss, and Reload—A Cache Attack on the BLISS Lattice-Based Signature Scheme," in Cryptographic Hardware and Embedded Systems—CHES 2016: 18th International Conference, Santa Barbara, CA, USA, Aug. 17-19, 2016, Proceedings, B. Gierlichs and A. Y. Poschmann, Eds. Berlin, Heidelberg: Springer Berlin Heidelberg, 2016, pp. 323-345.

Buchmann et al., "XMSS—A Practical Forward Secure Signature Scheme based onMinimal Security Assumptions," in Proceedings of the4th International Conference on Post-Quantum Cryptography, ser. PQCrypto'11. Berlin, Heidelberg: Springer-Verlag, 2011, pp. 117-129.

Camara et al., "Security and privacy issues in implantable medical devices: A comprehensive survey" J Biomed Inform . Jun. 2015;55:272-89.

Chen et al. "Light-weight and privacy-preserving authentication protocol for mobile payments in the context of IoT." IEEE Access 7 (2019): 15210-15221.

Cheng et al., "Lattice-based signature from key consensus." Cryptology ePrint Archive (2018). 19 pages.

Costello et al., "Schnorrq: Schnorr signatures on fourq," MSR TechReport, 2016. Available at: https://www.microsoft. com/en-us/research/wpcontent/uploads/2016/07/SchnorrQ. pdf, Tech. Rep., 2016. 5 pages.

Ding et al., "Rainbow, a new multivariable polynomial signaturescheme," in International Conference on Applied Cryptography and Network Security. Springer, 2005, pp. 164-175.

Ducas et al., "Crystals—dilithium: Digital signatures from module lattices." Cryptology ePrint Archive, Report 2017/633, 2017, http://eprint.iacr.org/2017/633.). 18 pages.

Ducas et al., "Lattice Signatures and Bimodal Gaussians," in Advances in Cryptology—CRYPTO 2013: 33rd Annual Cryptology Conference, Santa Barbara, CA, USA, Aug. 18-22, 2013. Proceedings, Part I, R. Canetti and J. A. Garay, Eds. Berlin, Heidelberg: Springer BerlinHeidelberg, 2013, pp. 40-56.

Espitau et al., "Side-Channel Attacks on BLISS Lattice-Based Signatures," in Proceedings of the 2017 ACM SIGSAC Conference on Computer and Communications Security, CCS 2017,2017, pp. 1857-1874.

Fouque et al., "Falcon: Fast-fourier latticebasedcompact signatures over ntru," Submission to the NIST?s post-quantum cryptography standardization process, 2018. 75 Pages.

Garcia et al., "Make Sure DSA Signing Exponentiations Really areConstant-Time" in Proceedings of the 2016 ACM SIGSAC-Conference on Computer and Communications Security, ser. CCS '16. New York, NY, USA: ACM, 2016, pp. 1639-1650.

Güneysu et al., "Practical lattice-based cryptography:A signature scheme for embedded systems," in Cryptographic Hardwareand Embedded Systems—CHES 2012, E. Prouff and P. Schaumont, Eds. Berlin, Heidelberg: Springer Berlin Heidelberg, 2012, pp. 530-547.

Hülsing et al., in Security Engineering and Intelligence Informatics, A. Cuzzocrea, C. Kittl, D. E. Simos, E.Weippl, and L. Xu, Eds. Berlin, Heidelberg: Springer Berlin Heidelberg,2013, pp. 194-208.

Hülsing, "Armed sphincs," in Public-Key Cryptography—PKC 2016. Springer, 2016, pp. 446-470.

Hutter et al., "Nacl on 8-bit avr microcontrollers," in Progress in Cryptology—Africacrypt 2013, A. Youssef, A. Nitaj, and A. E. Hassanien, Eds. 18 pages.

Ishai et al., "Improved upper bounds on information-theoretic private information retrieval (extended abstract)," in Proceedings of the Thirty-First Annual ACM Symposium on Theory of Computing, ser. STOC '99. New York, NY, USA: Association for Computing Machinery, 1999, p. 79-88. [Online]. Available:https://doi.org/10.1145/301250.301275.

(56) References Cited

OTHER PUBLICATIONS

K. MacKay, "micro-ecc: Ecdh and ecdsa for 8-bit, 32-bit, and 64-bit processors," Github Repository, 2013. [Online]. Available: https://github.com/kmackay/microecc. 3 pages.

Kannwischer et al., "pqm4: Testing and benchmarking nist pqc on arm cortex-m4," 2019. Radboud Repository, Downloaded Jul. 29, 2022, 23 pages.

Khalid et al., "Lattice-based Cryptography for IoT in A Quantum World: Are We Ready?" in 2019 IEEE 8th International Workshop on Advances in Sensors and Interfaces (IWASI), 2019, pp. 194-199.

Kiltz et al., "A Concrete Treatment of Fiat-ShamirSignatures in the Quantum Random-Oracle Model," in Advances in Cryptology—Eurocrypt 2018, J. B. Nielsen and V. Rijmen, Eds. Cham: Springer InternationalPublishing, 2018, pp. 552-586.

Liu et al., "FourQ on embeddeddevices with strong countermeasures against side-channel attacks," in CryptographicHardware and Embedded Systems—CHES 2017,W. Fischer and N. Homma,Eds. Cham: Springer International Publishing, 2017, pp. 665-686.

Lyubashevsky et al., "Asymptotically efficient lattice-based digital signatures," J. Cryptology, vol. 31, No. 3, pp. 774-797, 2018.

Lyubashevsky, "Fiat-shamir with aborts: Applications to lattice and factoringbasedsignatures," in Advances in Cryptology—Asiacrypt 2009: 15th InternationalConference on the Theory and Application of Cryptology and Information Security, Tokyo, Japan, Dec. 6-10, 2009. Proceedings, M. Matsui, Ed. Berlin, Heidelberg:Springer Berlin Heidelberg, 2009, pp. 598-616.

Merkle, "A certified digital signature," in Proceedings on Advances in cryptology,ser. CRYPTO '89. New York, NY, USA: Springer-Verlag, 1989, pp. 218-238.

Migliore et al., "Masking dilithium—efficientimplementation and side-channel evaluation," in Applied Cryptography and NetworkSecurity—17th International Conference, ACNS 2019, Bogota, Colombia, Jun. 5-7, 2019, Proceedings, 2019, pp. 344-362.

Noura et al., "DistLog: A distributed logging scheme for IoT forensics," Ad Hoc Networks, vol. 98, p. 102061, 16 pages. 2020. [Online]. Available: https://www.sciencedirect.com/science/article/pii/S1570870519306997.

Ozmen et al., "Energy-aware digital signatures forembedded medical devices," in 2019 IEEE Conference on Communications andNetwork Security (CNS), 2019, pp. 55-63.

"Pulse sensor by world famous electronics llc." https://pulsesensor.com. Downloaded Sep. 13, 2022, 2 pages.

Reyzin et al., "Better than BiBa: Short one-time signatures withfast signing and verifying," in Proceedings of the 7th Australian Conference onInformation Security and Privacy (ACIPS '02). Springer-Verlag, 2002, pp. 144-153.

Rushanan et al. "Sok: Security and privacy in implantable medical devices and body area networks. In 2014 IEEE symposium on security and privacy" (pp. 524-539).

Shor "Polynomial-time algorithms for prime factorization and discrete logarithms on a quantum computer." SIAM review 41.2 (1999): 303-332.

Yavuz, "ETA: Efficient and Tiny and Authentication for Heterogeneous Wireless Systems" in Proceedings of the sixth ACM conference on Security and privacy in wireless and mobile networks, ser. WiSec '13. New York, NY, USA: ACM, 2013,pp. 67-72.

ANSI X9.62-1998: Public Key Cryptography for the Financial Services Industry: The Elliptic Curve Digital Signature Algorithm (ECDSA), American Bankers Association, 1999. 128 pages.

\* cited by examiner

LIGHTWEIGHT POST-QUANTUM AUTHENTICATION

CROSS REFERENCE TO RELATED APPLICATION

This application claims priority to U.S. Provisional Application No. 63/185,205, filed on May 6, 2021, which hereby is incorporated herein by reference in its entirety.

STATEMENT OF GOVERNMENT SUPPORT

This invention was made with government support under CNS-1917627 awarded by the National Science Foundation. The government has certain rights in the invention.

TECHNICAL FIELD

The technology discussed below relates generally to authentication, and more particularly, to digital signature.

INTRODUCTION

Authentication is a fundamental cyber-security service to ensure the authenticity, origin, and integrity of the critical data. Digital signature is an essential cryptographic tool to offer authentication with public verifiability, non-repudiation, and scalability via public key infrastructures. However, digital signatures rely on expensive public key operations that can be highly costly for low-end devices typically seen in Internet of Things and Systems (IoTs). This efficiency concern especially deepens when post-quantum secure digital signatures are considered. Hence, what are needed are systems and methods that improve device quantum-safe digital signatures that are suitable for IoT and other applications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects of the disclosure, a method for lightweight post-quantum authentication may include receiving a message and generating a security parameter. Based on the security parameter, the method may further include generating at least two seeds corresponding to at least two servers based on the security parameter, transmitting the at least two seeds to each server of the at least two servers, determine a private key based on the security parameter or the at least two seeds, and generating, on the message, a signature based on the private key.

In other aspects of the disclosure, a method for lightweight post-quantum authentication may include receiving, from a signer, a signature on a message, obtaining at least two partial public keys, determining a full public key based on the at least two partial public keys, and authenticating the signature on the message based on the full public key.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

DETAILED DESCRIPTION

Figures 1A, 1B:
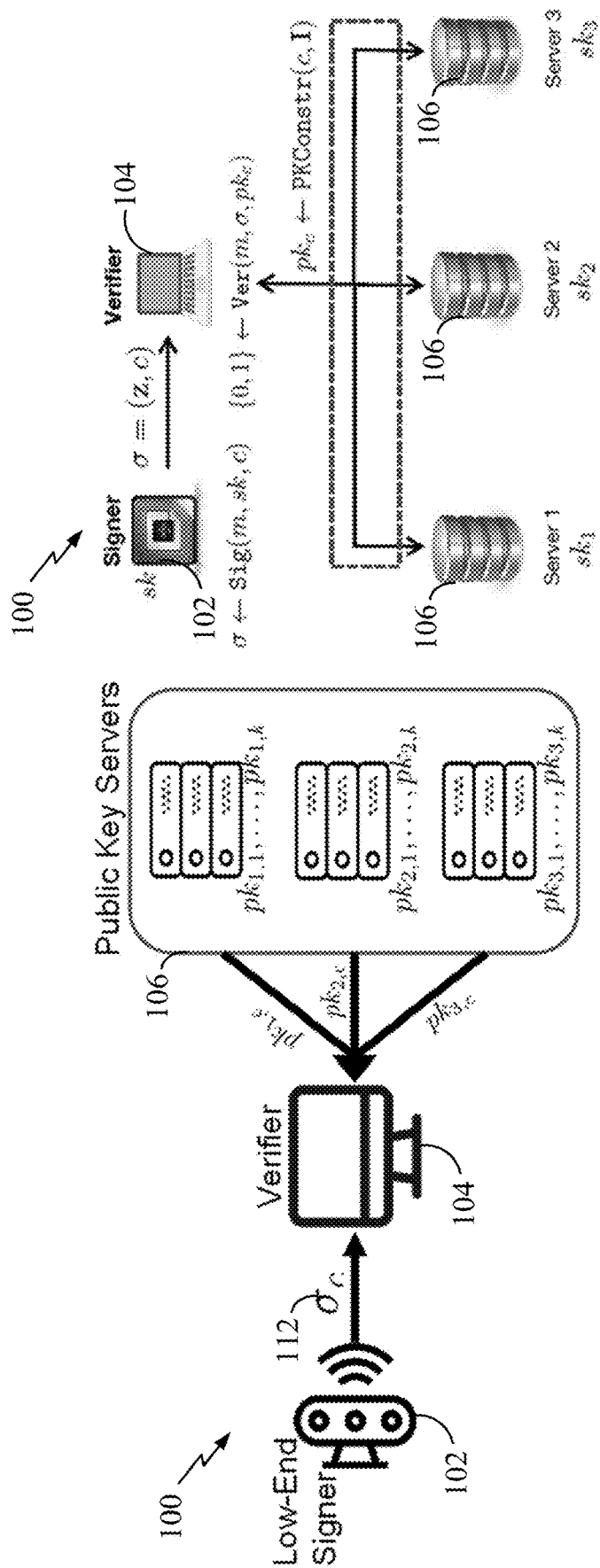
FIGS. 1A and 1B are schematic illustrations of an example system model with a plurality of public key servers according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, or systems. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments.

The present disclosure discloses a novel lightweight quantum-safe digital signature. In some examples, the lightweight quantum-safe digital signature can be used for resource-limited IoT nodes/devices that may have processing, memory, and bandwidth limitations. An example of a lightweight quantum-safe digital signature, a category variously called ANT herein, may be based on a one-time lattice-based signature with a distributed verification process via semi-honest verification servers. Systems based upon such an approach can enable a highly resource-limited signer (or any other signer) to compute signatures without costly lattice operations (e.g., rejection samplings, matrix multiplications), and only with a low memory expansion/footprint and compact signature sizes. The signer does not need to replenish one-time key pairs and therefore can compute practically unbounded number of signatures without interacting with verification servers. ANT can be extended into variants offering special features such as forward-security that would be otherwise extremely costly with the state-of-the-art quantum safe signatures.

Providing efficient authentication and integrity for communication in emerging IoT systems is desirable to ensure the security of such systems against common attacks like man-in-the-middle, impersonation, etc. A reasonable measure to provide these properties is via message authentication codes. However, this symmetric primitive, while very efficient, uses pair-wise key distribution and storage and fails to provide non-repudiation and public verifiability which are often desirable for some IoT applications like medical devices.

Digital signatures provide public verifiability and non-repudiation while being widely scalable, and therefore represent an example solution for providing authentication and integrity for IoT applications. However, such schemes usually use expensive operations which could make the introduced cryptographic overhead intolerable for some IoT applications, especially those which involve low-end devices. In addition, cryptosystems based on conventional hard problems (e.g., discrete logarithm problems) will be broken with the eventual emergence of quantum computers.

In some scenarios, it is desirable to consider long-term security (in other words, cryptosystems that are sufficiently robust that they are likely to hold up as computational modalities advance such as with quantum computing). However, many robust signature schemes could be very computationally expensive for some IoT applications. For instance, for a resource-limited medical sensor that periodically generates and signs sensitive medical readings to be verified by a cloud service provider, the efficiency of the signing algorithm directly translates to a longer battery life. In some examples, to ensure a long-term security, security against quantum computers can be considered. However, it should be appreciated that the post-quantum security measures (e.g., example lightweight quantum-safe digital signatures) illustrated in the present disclosure are not limited to security against quantum computers. The example lightweight quantum-safe digital signatures can be used for any suitable devices to ensure pre-quantum or post-quantum security.

Example signer efficient and compact digital signature schemes in the present disclosure may meet the battery, bandwidth, and memory needs of resource-limited IoT devices (e.g., implantable medical devices, banking devices, air-drones, autonomous vehicles, various sensors in a smart city or a smart airport, etc.) and improve their operation time with minimal intervention.

In some scenarios, some signature schemes are designed to improve signer efficiency. For instance, K-time signature schemes may incur linear storage (with K) on the verifier and need signer intervention after K signatures are generated. Another scheme may be based on Schnorr signatures, where the commitment value is outsourced to a distributed server. In such a scheme, while signing could be done locally, verification can only be done after interaction with distributed servers. However, the scheme does not provide post-quantum security.

Existing post-quantum signature approaches could be very expensive for low-end devices. One-time signatures may provide efficient signing with post-quantum security. However, such schemes may suffer from public key management and certification hurdles, where the signer generates new public keys for each signature and certifies them via the certificate authority. Another alternative may generate T number of public keys ahead of time, certify them, and store them on a remote server (or even the verifier's side). However, the public keys will be depleted after T signatures, which would use the signer's intervention to generate a new batch. This is similar for online/offline signatures and pre-computation techniques which also use the signer to store precomputed tables.

Here, example techniques in the present disclosure may be considered for applications that both benefit from low resource demand and also benefit from post-quantum (or other future improvement in computation) insecurities. Examples in the present disclosure ensure communication, computation, and storage efficiency for the signer, while maintaining a reasonable overhead for the verifiers with a distributed verification process. In some examples, the verifiers may be resourceful, as it is typically the case for many IoT applications (e.g., resourceful servers collect the data and verify it). (i) An efficient signing algorithm may be used to avoid costly operations (e.g., rejection sampling) and only use efficient symmetric key based operations and efficient arithmetic. (ii) Online/offline methods that use the signer's intervention after a certain time period (e.g., signing T signatures) may be used. (iii) Given the memory limitations of the low-end devices, exploiting the signer to store precomputed tokens/tables as in online/offline signatures or some optimization methods may be avoid. (iv) These low-end devices may be usually connected via a low-bandwidth network. Therefore, a constant and compact size signature disclosed in the present disclosure may be desirable.

A new signature scheme with post-quantum security called "ANT" may be used for signature generation on highly resource limited IoT devices. ANT may eliminate the public key generation, storage, certification, and transmission from the signer in one-time lattice-based signature. To achieve this, the present disclosure presents one or more algorithms to enable the distributed construction of the public key on the verifier's side, without using any intervention from the signer. In some examples, the verifier may interact a set of semi-honest servers to obtain the public key of the signer with respect to a given signature. This may significantly reduce the signing cost on the signer's side.

(i) Signing Efficiency: The signature generation of ANT-based implementations may be as efficient as its underlying one-time signature scheme and it does not utilize the verifier to store large tables of public keys. This high signing efficiency directly translates to a lower energy consumption and longer operation time when implemented on battery-powered devices. When implemented a typical resourceful computer (e.g., a PC or cloud system) (see Table 2), ANT-based solutions may be at least 10× faster than its counterparts, currently in the third round of National Institute of Standards and Technology (NIST) post-quantum cryptography (PQC) standardization.

(ii) Memory Efficiency: ANT techniques are memory efficient for the signer. More specifically, unlike other counterparts, ANT does not use the signer to generate and store tokens that will be depleted after a certain number of signatures. In addition, the private key size of ANT is 0.03-0.09 KB while the private key size of other counter parts could be more than 0.25 KB. Further, since ANT might not use the signer to compute a commitment (unlike other counterparts), it has minimal (compared to its post-quantum counterparts) memory expansion at the signer's side.

(iii) Compact Signature: ANT and its variants, unlike its lattice-based counterparts, may not be based on the Fiat-Shamir with aborts (FSA) paradigm. In the FSA paradigm, the masking term, which directly affects the signature size, has a large norm to fully mask the private key. Therefore, ANT and its variants can have a smaller signature size than their post-quantum counterparts. For instance, the signature size of ANT-II is about 5.5 smaller than the ones in other counterparts. In further examples, for the maximum number of $2^{64}$ number of signatures to be generated, the signature size of ANT may be only 64 bits larger than signature size of its underlying one-time signature.

(iv) Side-channel resiliency: Current lattice-based signatures based on the FSA paradigm rely on methods such as Gaussian or rejection sampling that are shown to be prone against side-channel attacks. Moreover, the side-channel attacks can exploit the weak random number generators (specially in low-end devices) in signatures based on Fiat-Shamir transform. However, ANT does not require any Gaussian or rejection sampling during the signing. Moreover, the private key components can be generated deterministically, and therefore, it is not prone to the common side-channel attacks.

(v) Forward Security: The forward security property may ensure the authenticity and integrity of the data items before an attack point. It may be achieved by evolving the secret key periodically (e.g., every hour or per signing). The example forward secure signatures can substantially enhance the breach resiliency of critical infrastructures, and therefore have various applications in IoTs and forensics. ANT-FS is the first signer-optimal polynomially-bounded lattice-based signature with forward security.

(vi) Improved Post-quantum Security: ANT, unlike lattice-based schemes relying on the FSA paradigm, might not use random oracles model (ROM). The transformation to provide quantum security proof for signature schemes in the ROM could incur some efficiency loss. Since ANT security is not based on such assumption, the example post-quantum security in the present disclosure is achieved without a significant efficiency loss. Further, the example schemes in the present disclosure support post-quantum computers. In some examples, short algorithms with quantum computers can solve factorization of large interested into prime factors, and Discrete Logarithm Problems (DLP). Hence, conventional schemes cannot use in quantum computers because quantum computing can break the conventional schemes and these math assumptions in the conventional schemes are not secure against quantum computers.

The signature verification in ANT may be distributed. More specifically, the verifier may contact the server(s) to obtain the public key of the signer corresponding to a particular signature. However, in some examples, the verifier's machine may be a computer (e.g., server, or other computer without significant resource constraints) with stable high bandwidth connections. In the ANT scheme, the signer might not interact with any party to generate the signature. Servers may be semi-honest and non-colluding. ANT may remain secure even if (t−1) parties collude among t. ANT may be a suitable candidate in applications where highly efficient signing algorithm is desired and a few milliseconds of delay on the verifier's side (due to the interaction with servers).

Notation. A ring can be expressed as: $\mathcal{R}=\mathbb{Z}_q[x]/(x^n+1)$ where q is a prime and n is a power of 2. Each element of R is represented as a polynomial of degree n−1. The scheme is parametrized by m, n, q and $\mathcal{D}_{xy}$, $\mathcal{D}_c$, and $\mathcal{D}_{ver}$. Vectors are denoted as bold letters (i.e., a) while scalars are denoted non-bold.

$$a \xleftarrow{\$} \mathcal{S}$$

denotes a is being sampled randomly from set $\mathcal{S}$. |a| denotes the bit length of a, i.e., $|a|=\log_2 a$. For a vector $a=(a_1, \ldots, a_1)$, we define $\|a\|_\infty = \max\{|a_i|:i=1, \ldots, n\}$. In some examples, given the ring $\mathcal{R}$ and a matrix $A \in \mathcal{R}^{k \times l}$, the Small Integer Solution over Rings problem (Ring-SISRing—$SIS_{q,n,k,l,\beta_{xy}}$) asks to find a non-zero vector $s \in \mathcal{R}^l$ such that $\|s\|_\infty \leq \beta_{xy}$ and As=0 mod q.

$\mathcal{K} \subset \mathcal{R}$ may be defined with small coefficients (i.e., $\leq \mathcal{D}_{xy}$) as a private key space. $\mathcal{S} \subset R$ is defined as a signature space with coefficients $\leq \mathcal{D}_{ver}$. $H_1(\cdot)$ may be used to map arbitrary length messages to the message space $\mathcal{M}$ with vectors with exactly $\mathcal{D}_c$ number of 1 or −1 with the rest of the elements being 0. $H_2:\{0,1\}^* \times \mathbb{Z}_p \to \{0,1\}^*$. A Pseudo Random Function may be defined as $PRF_1: \{0,1\}^* \to \{0,1\}^*$.

Definition 1. A signature scheme may consist of three algorithms SGN=(Kg, Sig, Ver) defined as follows.

(sk, pk)←SGN.Kg($1^\mathcal{K}$): Given the security parameter $\mathcal{K}$, it may output the private and public key pair (sk, pk). In some examples, (sk, pk)←SGN.Kg(params): Given params, it may output the private and public key pair (sk, pk). params←SGN.Kg($1^\mathcal{K}$): Given the security parameter $1^\mathcal{K}$, it may set up the systems by outputting the system parameters params.

σ←SGN.Sig(m, sk): Given the message m and the signer's private key sk, it may output the signature σ.

$\{0,1\} \leftarrow$ SGN.Ver(m, σ, pk): Given a message-signature pair (m, σ), and the claimed signer's public key pk, it may output a decision bit $d \leftarrow \{0,1\}$.

A Lyubashevsky and Micciancio one-time signature scheme LM-OTS=(Setup, Kg, Sig, Ver) may be defined as follows. The scheme may be presented as in is original form. A person having ordinary skill in the art may adapt this scheme to the modular ring setting.

Definition 2. (sk, pk)←Setup($1^{\mathcal{K}}$): Given security parameter $\mathcal{K}$, system setup may start by selecting the parameters params=(m, n, q, $\mathcal{D}_{xy}$, $\mathcal{D}_c$, $\mathcal{D}_{ver}$) and the ring $\mathcal{R}$. It then may select $A \in \mathcal{R}^{k \times l}$ and publish it for all the users in the systems. In some examples, params←LM-OTS.Setup($1^{\mathcal{K}}$): Given security parameters $\mathcal{K}$, the system setup may start by selecting the parameters q, n, k, l, and the ring $\mathcal{R}$. It then may select $A \in \mathcal{R}^{k \times l}$, and publish params=(q, n, k, l, A) for all the users in the system.

(sk, pk)←Kg(params) or LM-OTS.Kg(params): The user may select $[s_1, s_2] \in \mathcal{K}^{l \times 2}$ as their private key and compute $t = As_1 \in \mathcal{R}$, $t' = As_2 \in \mathcal{R}$. It may set sk←$[s_1, s_2]$ and pk←(t, t').

z←Sig(sk, m) or LM-OTS.Sig(sk, m): Given sk and m, the signer may first compute the signature as $z \leftarrow s_1 H_1(m) + s_2$.

$\{0,1\} \leftarrow$ Ver(m, z, pk) or LM-OTS.Ver(m, z, pk): Given a message-signature pair (m, z) and the public key pk, the verifier checks if $A^T z = tH_1(m) + t'$ holds, output 1, else output 0.

Definition 4. A protocol may be called computational t-private if it is computationally hard for any subset of servers Γ where |Γ|≤t, to produce/compute any information other than what could have been computed individually from their set of private inputs.

Here, various system, threat, and security models for a scheme may be defined.

An example system 100 in this disclosure may be designed around heterogeneous IoT systems or other networks of devices having resource constraints. For example, the system 100 may include battery-powered low-end devices (e.g., implantable sensors, that may need to operate for a long time, which send signed measurements to verifiers on more resource-full machines (e.g., laptop), or sensors of a smart grid or smart city infrastructure). As shown in FIGS. 1A and 1B, three types of entities in the system model can exist: i) the signer 102, ii) the verifier 104, and iii) servers 106. For the system model 100, a highly resource-limited signer 102 that computes signatures $σ_c$ 112 may be considered. The signer 102 might not be expected to store and/or communicate the public keys. The signer might only use its private key to compute the signatures $σ_c$ 112, for period c. This may enable efficient signing and meet the stringent requirements of the low-end signer in the system model. However, in some examples, the signer 102 may store and/or communicate the public keys. The verifier 104 may include hardware capable of communicating with the public key servers 106. For example, the verifier 104 may include a rather resourceful machine (e.g., server, or other computational hardware that does not have resource constrains often associated with mobile, IoT, or edge devices) with high bandwidth connection, capable of communicating with the public key servers. Lastly, the public key servers 106 may be assumed to be non-colluding. The system model 100 may include l distinct servers 106 (in FIGS. 1A and 1B we consider l=3). After the initialization step, a synchronous network which may include the verifier 104 and the servers 106 may exist. The verifier 104 can query for public key components $pk_{j,c}$ (for 1≤i≤l) before/after receiving the signature $σ_c$ from the signer 102.

The system model can be called a signature scheme with distributed public key computation (DPC), In addition to the algorithms defined in Definition 1, the new scheme may have a public key construction algorithm PKConstr(•) that enables the verifier to obtain the public key for a particular signature.

Definition 5. A signature scheme with distributed public key computation may include four algorithms SGN-DPC= (Kg, Sig, Ver PKConstr) defined as follows.

params←LM-OTS.Setup($1^{\mathcal{K}}$): Given security parameters $\mathcal{K}$, it may set up the systems by outputting the system parameters params.

(sk, c.<$sk_1$, ..., $sk_t$>)←SGN-DPC.Kg(params): Given the parameter params, the signer may compute the initial state c and its private key sk. Using the private key sk it computes, the t private key components $\{sk_1, ..., sk_t\}$ to be securely transmitted to the servers. In some examples, the algorithm may only take place once to sign polynomial number of signatures.

σ←SGN-DPC.Sig(m, sk, c'): Given a message m, the signer's private key sk and the current state c', it may output the signature σ=(z, c), where c is the updated state.

$pk_c$←SGN-DPC.PKConstr(c, I): Given c and server indexes I=<1, ..., t>, it may query the partial public key $pk_{j,c}$ that corresponds to the $c^{th}$ signature, for each server in I and compute the final public key $pk_c$ for state c.

$\{0, 1\} \leftarrow$ SGN-DPC.Ver(m, σ, $pk_c$): Given a message-signature pair (m, σ), and the claimed signer's public key $pk_c$, obtained from the above algorithm, it may output a decision bit $\{0, 1\}$.

Following the system model given above, l public key servers may be non-colluding. By non-colluding, it may be assumed that at least one of the l servers does not reveal its secret information to another server. In other examples, the t public key servers are t-private in Definition 4 above. It may be also assumed that the servers are semi-honest where they passively listen to all communication, however, they do follow the protocol and do engage in active data injection. In further examples, the servers may be honest-but-curious where they follow the protocol but strive to learn as much as possible from the information being received, observed, or shared.

In the following definition, the security of signature schemes can be defined. In some examples, the signature scheme may be associated with the standard EU-CMA definition but equip A with two additional oracles.

CrptServer(j): For 1≤j≤t, this oracle provides A with the secret seed associated with server j. This oracle may be queried for up to t−1 different servers, and it may capture the t-private property of the DPC model.

PKConstr(st, j): Given the state c, and 1≤j≤t, this oracle may return the partial public key $pk_{j,c}$.

After the initialization phase (i.e., SGN.Kg(•), SGN-DPC.Setup(•) and/or SGN-DPC.Kg(•)) the adversary A may be given access to the signature generation oracle. The adversary A wins, if it outputs a valid message-signature pair (that was not previously outputted from the sign oracle) after making polynomially-bounded number of queries.

Definition 6. Existential Unforgeability under Chosen Message Attack (EU-CMA) experiment $Expt_{SGN}^{EU-CMA}$ may be defined as follows.

(sk, pk)←Kg($1^k$). In some examples, (sk, pk)←SGN-DPC.Kg(params), params←SGN-DPC.Setup($1^k$)

$(m^*, \sigma^*) \leftarrow A^{Sig(\cdot)}(pk)$ In some examples, $(m^*, \sigma^*) \leftarrow A^{SGN-DPC.Sig(\cdot), CryptServer(\cdot), PKConstr(\cdot)}(\cdot)$ If $1 \leftarrow Ver(m^*, \sigma^*, pk)$ and $m^*$ was not queried to SGN.Sig (•), return 1, else, return 0. In some example, if $1 \leftarrow$ SGN-DPC.Ver($m^*, \sigma^*, pk$), $m^*$ was not queried to SGN-DPC.(•), and CryptServer(•) has been only called on maximum of t−1 servers, return 1, else, return 0.

The EMU-CMA advantage of A may be defined as $Adv_{SGN}^{EU-CMA} = Pr[Expt_{SGN}^{EU-CMA} = 1]$ or $Adv_{SGN-DPC}^{EU-CMA} = Pr[Expt_{SGN-DPC}^{EU-CMA} = 1]$.

Forward Security. A forward secure (FS) signature scheme may be a key-evolving digital signature scheme where the operation of the signature generation is divided into time periods. In some examples, each time period may use a different private key to sign a message. Hence, FS signature scheme may have an additional key update algorithm to evolve the secret key at the end of each time period. In the example model, since the secret key may be updated after each instance of signature generation, the private key update functionality can be incorporated in both SGN-DPC.Sig(•) and SGN-DPC.PKConstr(•) to reduce the complexity of our model. In SGN-DPC.Sig(•), the update may happen after every instance of signature generation algorithm. In SGN-DPC.PKConstr(•), the update may happen after each public key query on distributed servers.

The security model of FS signatures may be similar to the model in Definition 6 except that the adversary is equipped with an additional oracle, BreakIn(•), which returns the current private key to the adversary A. In the case of the example scheme, if the adversary has queried j signature queries to the signing oracle, the BreakIn oracle can return the (j+1)th private key to the adversary. In addition to the winning condition in Definition 6, the secret key corresponding to the forgery signature might not be outputted by BreakIn(•) (i.e., to prevent trivial forgery).

Here, the example model can ensure communication, computation, and storage efficiency for the signer, while maintaining a reasonable overhead for the verifiers with a distributed public key computation. In some embodiments, the verifiers can be resourceful (e.g., resourceful servers to collect and verify the data). The example model can achieve as follows: (i) an efficient signing algorithm that avoids costly operations (e.g., rejection sampling) and only requires efficient symmetric key based operations and efficient arithmetics; (ii) avoiding online/offline methods that require the signer's intervention after a certain time period (e.g., signing T signatures); (iii) avoiding to store precomputed tokens (e.g., unlike online/offline signatures, optimization tables) for efficient memory usage; and (iv) small-constant size of the signature.

The example model may achieve the above properties by efficiently transforming an efficient one-time signature to a polynomially-bounded signature. This may be done by shifting the public key generation and communication to a set of t public key construction servers where the verifier would communicate with before attempting to verify a signature. In some examples, after offline initialization phase, the signer does not necessarily interact with the public key servers, and may operate as in traditional signature schemes. This is a design property for ANT to achieve near-optimal signer efficiency.

Basic Scheme: The present disclosure provides a basic scheme for ANT, followed by its forward security version ANT-FS and variations to allow for more efficient public key certification methods. In some examples, $Samp_1: \{0,1\}^* \to \mathcal{K}^{t^l}$ and $Samp_2: \{0,1\}^* \to \mathcal{K}^{t^l}$. The distribution of $\mathcal{K}$ is computed based on the number of public key servers and $\mathcal{K}$.

Example distributed post-quantum signature schemes with efficient signature generation for low-end devices are provided in this disclosure. The scheme may be based on a one-time signature defined in Definition 2. The basic scheme is presented in Algorithm 1. In some examples, the basic scheme may shift the public key generation, certification, and communication to a set of t semi-honest servers. As depicted in Algorithms 1, in the ANT.Kg( ) algorithm, the signer may generate a t seeds $(z_1, \ldots, z_t)$ or t private key components $(sk_1, \ldots, sk_t)$ and send them to the t servers. The servers could also be preloaded with these secret keys, upon the production of the low-end device.

The signature generation of the one-time scheme may require the signer to generate a new public key for each signature. This may significantly increase signer computation and transmission overhead (signature plus public key per message), and likely inhibit its practice uses for low-end IoT systems. Thus, the example model addresses this significant limitation by leveraging the additive homomorphism of the keys to shift the public key generation burden to the distributed servers in our model. Therefore, the sig-nature generation algorithm ANT.Sig(•) may be highly efficient and does not require any involvement of the server and may be completely non-interactive. The verifier can initiate the ANT.PKConstr(•) or ConstructPK(•) algorithm to obtain the public key $pk_c$ for the time period c by interacting with the t servers. In some examples, the verifier can initiate this algorithm at any time (e.g., before the time period c).

After obtaining the public key $pk_c$, the verifier may initiate ANT.Ver(•) which is gain non-interactive, to verify the signature. In the verification algorithm ANT.Ver( ), the verifier may check the infinity norm ($\|z\|_\infty$), which is the value of the largest component in the vector (z). If the infinity norm ($\|z\|_\infty$) is larger than a predefined value ($\mathcal{D}_{ver}$ or $\beta_{ver}$), the verification algorithm may stop processing further and return the value 0. If the infinity norm ($\|z\|_\infty$) is not larger than the predefined value ($\mathcal{D}_{ver}$ or $\beta_{ver}$), the verifier may contact the t servers and obtain the partial public keys $(t_{c,j}, t'_{c,j})$, to be used to compute the final public key $(t_c, t'_c)$ at the verifier's side. In the basic scheme, it may be assumed that a secure channel between the verifier and the servers exists. Two similar basic schemes (both referred to as Algorithm 1: ANT Basic Scheme) are provided below.

| Algorithm 1 ANT Basic Scheme (Algorithm 1-1) |
|---|

$(sk, params) \leftarrow$ ANT.Kg $(1^k)$: Given $1^k$, generate the signer's private key and the private seeds for the t servers.
Select parameters p, q, l, k, t.

$w \xleftarrow{\$} \{0, 1\}^k, A \in \mathcal{R}^{k \times l}$

Select a counter c = 0
for j = 1, ..., t do
   $z_j \leftarrow PRF_1 (w, j)$
Distribute $\{z_1, ..., z_t\}$ to the t servers
return sk $\leftarrow$ w, params $\leftarrow$ (p, q, m, k, l, A)
$\sigma \leftarrow$ ANT.Sig (m, sk): Run by the signer to issue a signature on m.
      c $\leftarrow$ c + 1
for j = 1, ..., t do
   $z_j \leftarrow PRF_1 (w, j)$
   $x_{c,j} \leftarrow Samp_1 (z_j, c), y_{c,j} \leftarrow Samp_2 (z_j, c)$
   $x_c \leftarrow x_c + x_{c,j}, y_c \leftarrow y_c + y_{c,j}$
      $z \leftarrow x_c H_1 (m, c) + y_c$
return $\sigma = (c, z)$
$\{0, 1\} \leftarrow$ ANT.Ver (m, $\sigma$): An interactive protocol between the verifier and the t servers.
if $\|z\|_\infty \le \mathcal{D}_{ver}$ then:
   for j = 1, ..., t do
      $(t_{c,j}, t_{c,j}') \leftarrow$ ConstructPK (c, j)
      $t_c \leftarrow t_c + t_{c,j}, t_c' \leftarrow t_c' + t_{c,j}'$
   if $Az = t_c H_1 (m, c) + t_c'$ holds, then return 1
else return 0
$(t_{c,j}, t_{c,j}') \leftarrow$ ConstructPK (c, j): Given c, j each server returns $(t_{c,j}, t_{c,j}')$.
At server j do:
   $x_{c,j} \leftarrow Samp_1 (z_j, c), y_{c,j} \leftarrow Samp_2 (z_j, c)$
   $t_{c,j} \leftarrow x_{c,j} A, t_{c,j}' \leftarrow y_{c,j} A$
   $pk_{j,c} \leftarrow (t_{c,j}, t_{c,j}')$
return $pk_{j,c}$

| Algorithm 1 ANT Basic Scheme (Algorithm 1-2) |
|---|

(params) $\leftarrow$ ANT.Setup $(1^k)$: Given $1^k$, generate the parameters based on LM-OTS.Set$(1^k)$.
Return params = $(p, q, m, k, l, A \in \mathcal{R}_q^{k \times l})$
$(sk, c, < sk_1, ..., sk_t >) \leftarrow$ ANT.Kg (params): Given $1^k$, generate the signer's private key and the private seeds for the t servers.

$sk \xleftarrow{\$} \{0, 1\}^K$

Set state c = 0
for j $\in$ I where I = $\{1, ..., t\}$ do
   $sk_j \leftarrow PRF_1 (sk, j)$
Send the private key components $\{sk_1, ..., sk_t\}$ to the t servers
return (sk, c)
$\sigma \leftarrow$ ANT.Sig (m, sk, c): Run by the signer to issue a signature on m.
c $\leftarrow$ c + 1
for j = 1, ..., t do
   $sk_j \leftarrow PRF_1 (sk, j)$
   $x_{j,c} \leftarrow Samp_1 (sk_j, c), y_{j,c} \leftarrow Samp_2 (sk_j, c)$
   $x_c \leftarrow x_c + x_{j,c}, y_c \leftarrow y_c + y_{j,c}$
$z \leftarrow x_c H_1 (m, c) + y_c$
return $\sigma = (c, z)$
Public Key Construction
$pk_c \leftarrow$ PKConstruct (c, I): This algortihm is initiated by the verifier. Given c and j $\in$ I each server returns $(t_{c,j}, t_{c,j}')$ and the verifier computes the full public key $pk_c$.
At server j do:
   $x_{j,c} \leftarrow Samp_1 (sk_j, c), y_{j,c} \leftarrow Samp_2 (sk_j, c)$
   $t_{j,c} \leftarrow x_{j,c} A, t_{c,j}' \leftarrow y_{j,c} A$
   Send $pk_{j,c} \leftarrow (t_{j,c}, t_{j,c}')$ to the verifier
Verifier computes $t_c \leftarrow t_c + t_{j,c}, t_c' \leftarrow t_c' + t_{j,c}'$
return $pk_c = (t_c, t_c')$
$\{0, 1\} \leftarrow$ ANT.Ver (m, $\sigma$, $pk_c$): Given $pk_c$ obtained from the above algorithm, the verifier verifies the signature as follows.
if $\|z\|_\infty \le \beta_{ver}$ then:
   Parse $pk_c$ as $(t_c, t_c')$
   if $Az = t_c H_1 (m, c) + t_c'$ holds, then return 1
else return 0

Forward Security Scheme: Forward secure signatures may be designed to improve the breach resiliency of cyber infrastructures by mitigating the consequences of attacks where private keys (signing keys) are compromised. The forward security scheme may update the private key after each signature generation such that the new key cannot be used to sign for past time periods.

The present disclosure provides a forward secure variation of ANT, called ANT-FS, in Algorithm 2. The forward security scheme may offer a faster signature generation than the original scheme, with the cost of having a linear (to the number of servers) private key size. The initial seed is generated as a K bit string sk. sk may be then used to generate server seeds $sk_{j,c}$ (Step 4 in ANT-FS.Kg(•)) and then delete immediately (step 5 in ANT-FS.Kg(•)). The new scheme may achieve forward security by using a hash chain on the signer's side during signature generation and evolving the seeds on the server's sides using a new public key construction algorithm ANT-FS.PKConstr(•) or ConsturePK(•). Additionally, ANT-FS enjoys from a fast signing since it does not require the regenerating of the server seeds vis PRF calls. However, this may come with the cost of having a linear (to the number of servers) private key size. In some examples, the verification algorithm for ANT-FS may be identical as in the original scheme in Algorithm 1, therefore not repeated. Two similar ANT-FS (both referred to as Algorithm 2) schemes are provided below

---

Algorithm 2 ANT-FS (Algorithm 2-1)

---

(sk, params) ← ANT.Kg ($1^k$): Given $1^k$, generate the signer's private key and the private seeds for the t servers.
Select parameters p, q, l, k, t.

$w \xleftarrow{\$} \{0, 1\}^k, A \in \mathcal{R}^{k \times l}$

Select a counter c = 0
for j = 1, . . . , t do
    $z_j \leftarrow PRF_1$ (w, j)
delete w
Distribute $\{z_{1,c}, \ldots, z_{t,c}\}$ to the t servers
return sk ← $\{z_{1,c}, \ldots, z_{t,c}\}$, params ← (p, q, m, k, l, A)
σ ← ANT.Sig (m, sk): Run by the signer to issue a signature on m.
c ← c + 1
for j = 1, . . . , t do
    $x_{c,j} \leftarrow Samp_1 (z_j, c), y_{c,j} \leftarrow Samp_2 (z_j, c)$
    $x_c \leftarrow x_c + x_{c,j}, y_c \leftarrow y_c + y_{c,j}$
    $z_{j,c+1} \leftarrow H_2 (z_{j,c})$
    delete $z_{j,c}$
update sk
$z \leftarrow x_c H_1 (m, c) + y_c$
return σ = (c, z)
$(t_{c,j}, t_{c,j}') \leftarrow$ ConstructPK (c, j): Given c, j each server returns $(t_{c,j}, t_{c,j}')$.
c ← c + 1
At server j do:
    $x_{c,j} \leftarrow Samp_1 (z_j, c), y_{c,j} \leftarrow Samp_2 (z_j, c)$
    $t_{c,j} \leftarrow x_{c,j} A, t_{c,j}' \leftarrow y_{c,j} A$
    $pk_{j,c} \leftarrow (t_{c,j}, t_{c,j}')$
    $z_{j,c+1} \leftarrow H_2 (z_{j,c})$
return $pk_{j,c}$

---

Algorithm 2 ANT-FS (Algorithm 2-2)

---

(params) ← ANT-FS.Setup ($1^k$): This algorithm is identical to the one in Algorithm 1.
(c, < $sk_{1,c}, \ldots, sk_{t,c}$ >) ← ANT-FS.Kg (params): Given $1^k$, generate the signer's private key and the private seeds for the t servers.

$sk \xleftarrow{\$} \{0, 1\}^K$

Set state c = 0
for j ∈ I where I = {1, . . . , t} do
    $sk_{j,c} \leftarrow PRF_1$ (sk, j)
delete sk
Send the private key components $\{sk_{1,c}, \ldots, sk_{t,c}\}$ to the t servers
return sk ← $sk_{j,c}, \ldots, sk_{t,c}$ and state c
σ ← ANT-FS.Sig (m, sk): Run by the signer to issue a signature on m.
c ← c + 1
for j = 1, . . . , t do
    $x_{c,j} \leftarrow Samp_1 (sk_{j,c}, c), y_{c,j} \leftarrow Samp_2 (sk_{j,c}, c)$
    $x_c \leftarrow x_c + x_{c,j}, y_c \leftarrow y_c + y_{c,j}$
    $sk_{j,c+1} \leftarrow H_2 (sk_{j,c})$, delete $sk_{j,c}$
$z \leftarrow x_c H_1 (m, c) + y_c$
return σ = (c, z)
Public Key Construction for ANT-FS
$pk_c \leftarrow$ ANT-FS.PKConstr (c, I): This algorithm is initiated by the verifier. Given c and j ∈ I each server returns $(t_{c,j}, t_{c,j}')$ updates its private key component, and the verifier computes the full public key $pk_c$.

-continued

```
At server j do:
    x_{j,c} ← Samp_1 (sk_{j,c}, c), y_{c,j} ← Samp_2 (sk_{j,c}, c)
    t_{j,c} ← x_{j,c}A, t_{j,c}' ← y_{j,c}A
    sk_{j,c+1} ← H_2(z_{j,c})
    Send pk_{j,c} ← (t_{c,j}, t_{c,j}') to the verifier
Verifier computes t_c ← t_c + t_{j,c}, t_c' ← t_c' + t_{j,c}'
return pk_c = (t_c, t_c')
{0, 1} ← ANT-FS.Ver (m, σ, pk_c): This algorithm is identical to the one in Algorithm 1.
```

Signer independent offline certification management: As discussed, the example scheme is the base version of ANT, where the verifier may contact each server through the ANT.PKConstr algorithm to receive the corresponding public key $pk_c$. In some examples, public key certification might not be considered in the base version of the example scheme in Algorithm 1. Here, two variations of ANT which focus on different public key certification methods are provided.

There has been a wide array works to efficiently transform one-time signatures to multiple-time or polynomially-bounded many time signatures. However, generally, whenever a one-time signature is used arbitrary number of times, it may use arbitrary number of public keys and certificates. This problem may be addressed in hash-based signatures by bounding total number of signatures (albeit polynomially-bounded in) and building a Merkle tree MT on top. Thus, such existing schemes suffer from very large signatures. Here, to be suitable of resource-limited devices (often operating on low-bandwidth networks), very large signatures can be avoided by presenting two methods that enable public key certification without the involvement or incurring additional costs on the (low-end) signer in our design.

Figure 2:
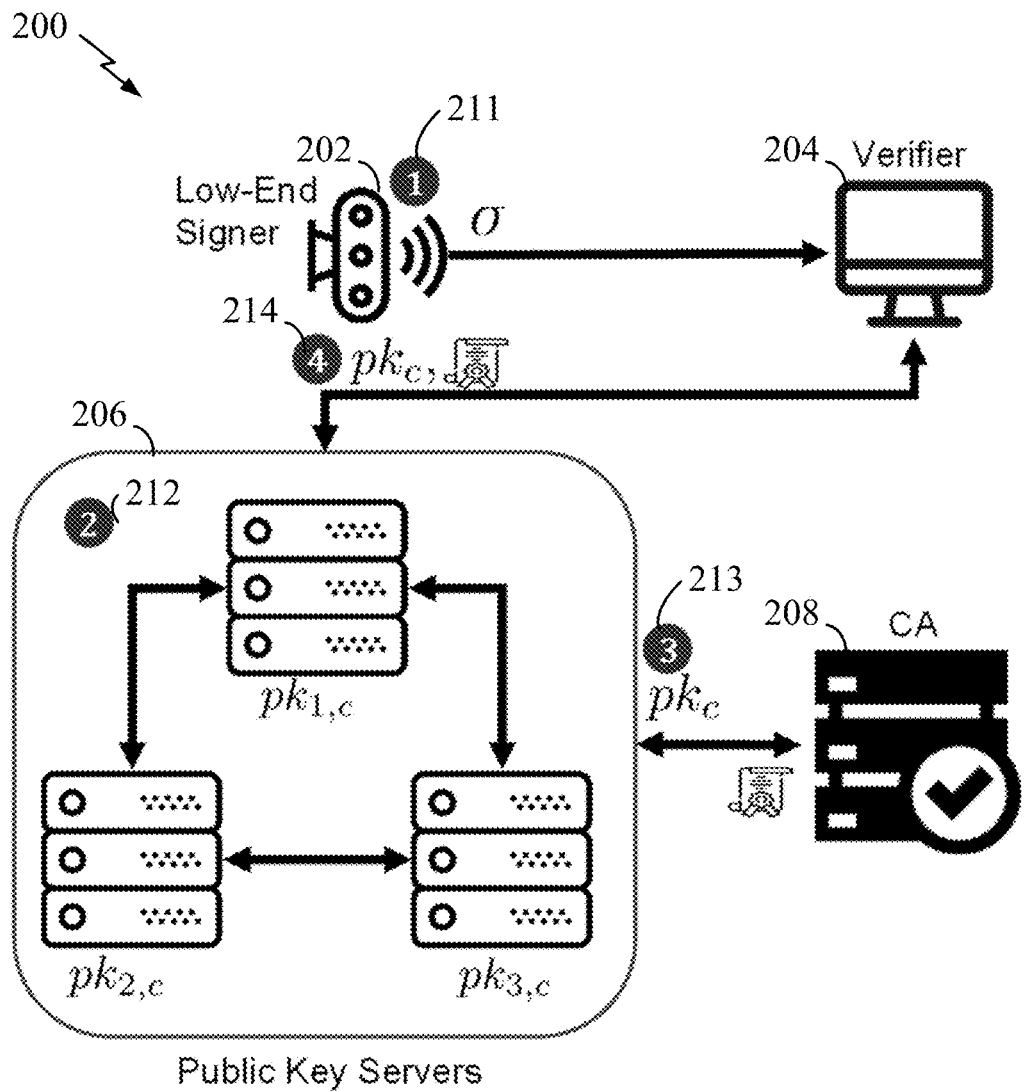
FIG. 2 is a schematic illustration of an example individual public key certification system according to some aspects of the disclosure.

1) Individual Public Key Certification: In order to provide public key certification, the present disclosure provides a variation of the ANT.PKConstr( ) or the ConstructPK( ) in Algorithm 3 as shown in FIG. 2. In the new ANT.PK-Constr( ) or ConstructPK( ) algorithm, every server j 206 may compute their public key components $pk_{j,c}$ using the provided secret seed and send it to all other servers. In the second step 212, all other servers 206 could use these partial public key components to compute the final public key $pk_c$ and send it to the certificate authority (CA) 208 to issue the certificate cert. While this method has optimal communication overhead, it interacts with the CA 208 (by the distributed public key servers) for a verification request.

Given such a design, the present disclosure can make use of precomputation to improve the performance of the verification algorithm in both ANT and ANT-FS. More specifically, given the signer 202 in the schemes in the present disclosure may not be involved in the verification algorithm and since ConstructPK does not depend on the message, in the certification methods above, the servers 206 can precompute $pk_c$ for the future δ signatures (i.e., c=1, . . . , δ). The public keys $pk_c$ along with their corresponding certificate $Cert_c$ can then be either stored at the servers to be downloaded at demand or directly downloaded to the verifiers' 204. This may significantly reduce the online overhead of ConstructPK( ) algorithm.

In further examples, in order to provide public key certification, a variation of the ANT.PKConstr(•) in Algorithm 3-2. In the new ANT.PKConstr(•) algorithm, every server j∈I may compute their public key components $pk_{j,c}$ using the provided secret seed and sends it to all other servers. In the second step, all other servers may use these partial public key components to compute the final public key $pk_c$ and send it to the certificate authority (CA) to issue the certificate $cert_c$. While this method may have optimal communication overhead, it may use interaction with the CA (by the distributed public key servers) for a verification request.

The unique design of the new scheme may enable the utilization of a precomputation method to improve the performance of the verification algorithm in both ANT and ANT-FS. More specifically, given the signer in our schemes is not involved in the verification algorithm and since ANT.PKConstr(•) does not depend on the message, in the certification methods in Algorithm 3, the servers can precompute $pk_c$ for the future $2^γ$ signatures (i.e., c=1, . . . , $2^γ$). The public keys $pk_c$ along with their corresponding certificate $cert_c$ can then be either stored on the servers to be downloaded on demand or directly downloaded to the verifiers'. This will significantly reduce the online overhead of ANT.PKConstr(•) algorithm. Two similar algorithms are provided below (both referred to as Algorithm 3).

```
Algorithm 3 Public Key Construction with Certification (Algorithm 3-1)

(t_{c,i}, t'_{c,i}, cert) ← ConstructPK (c):
for j = 1, . . . , t do
    x_{c,j} ← Samp_1 (z_j, c), y_{c,j} ← Samp_2 (Z_j, c)
    t_{c,j} ← x_{c,j}A, t'_{c,j} ← y_{c,j} A
    pk_{j,c} ← (t_{c,j}, t'_{c,j})
    Send pk_{j,c} to other t − 1 servers
    for i = 1, . . . , t, server i do
        t_c ← t_c + t_{c,i}, t'_c ← t'_c + t'_{c,i}
    pk_c ← (t_c, t'_c)
Send pk_c to the CA to receive cert
return (pk_c, c)

Algorithm 3 Public Key Construction with Certification (Algorithm 3-2)

(pk_c, cert_c) ← ANT.PKConstr (c):
for j = 1, . . . , t do
    X_{j,c} ← Samp_1 (sk_j,c), y_{j,c} ← Samp_2 (sk_j, c)
    t_{j,c} ← x_{j,c}A, t'_{j,c} ← y_{j,c}A
    pk_{j,c} ← (t_{c,j}, t'_{c,j})
    Send pk_{j,c} to other t − 1 servers
    After receiving all other pk_{j,c} from severs compute:
        t_c ← t_c + t_{c,i}, t'_c ← t'_c + t'_{c,i}
    pk_c ← (t_c, t'_c)
Send pk_c to the CA to receive cert_c
return (pk_c, cert_c)
```

Figure 3B:
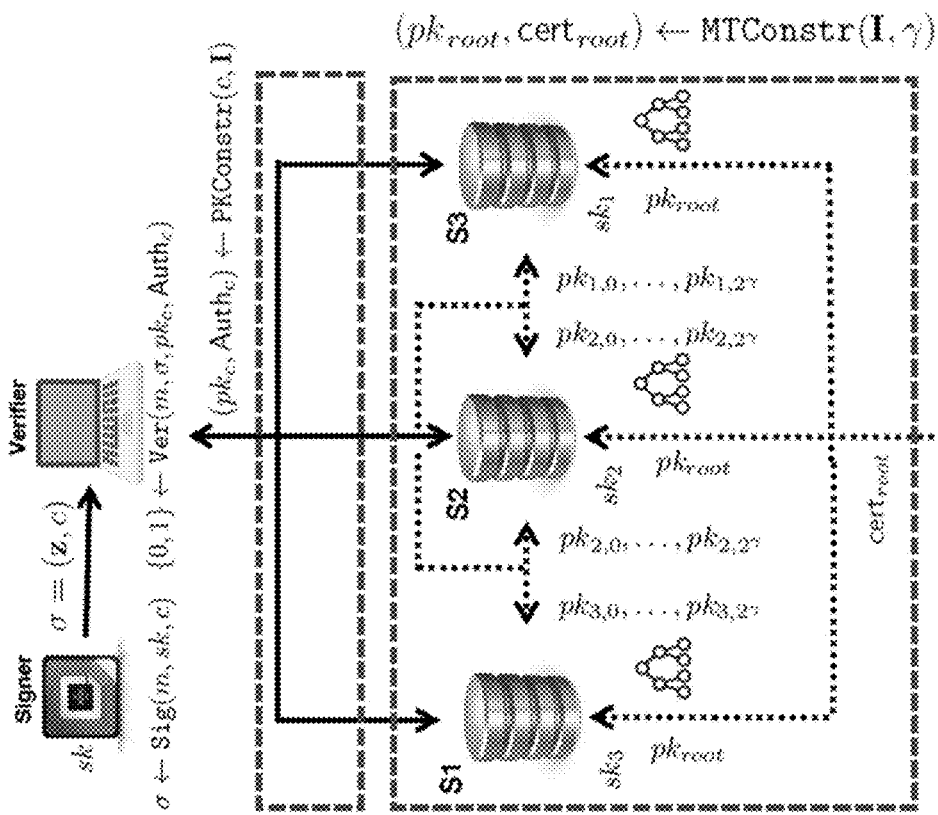
FIGS. 3A and 3B are schematic illustrations of example batch certification systems with Merkle Tree according to some aspects of the disclosure.
Figure 3A:
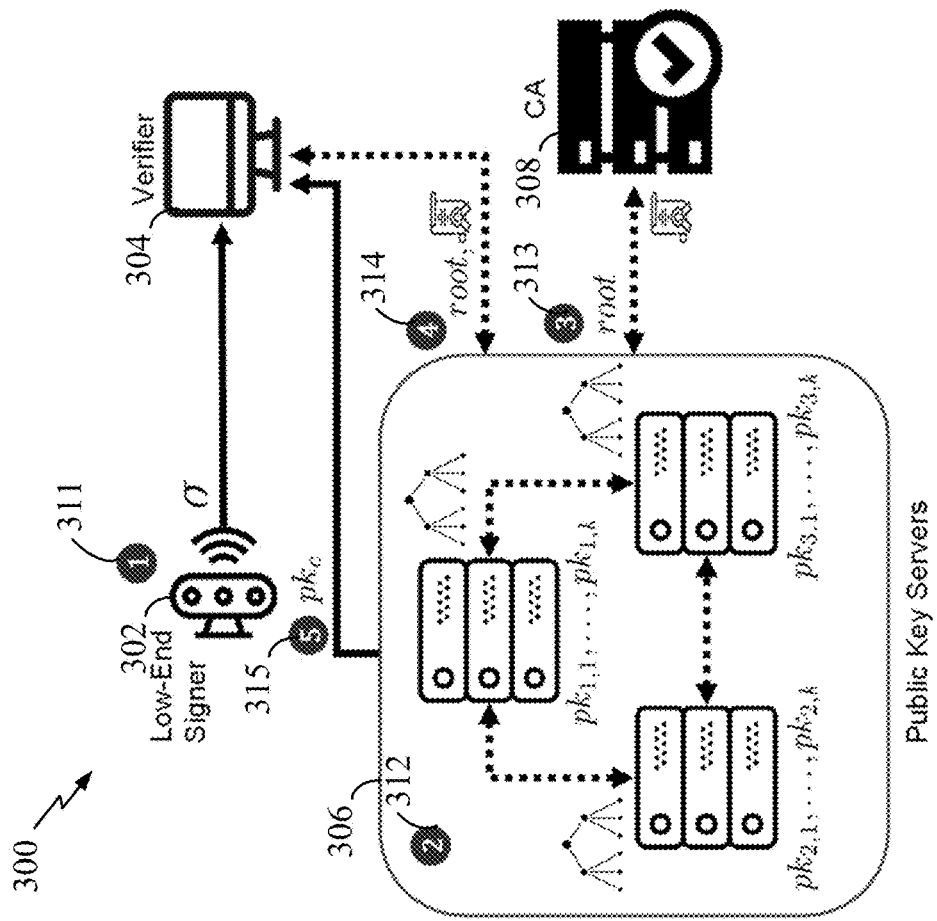

2) Batch Certification with Merkle Tree: To minimize certificate requests, the implementations described herein may also allow for the adoption of Merkle Tree (MT) techniques. As depicted in FIG. 3A, the servers 306 may collaborate to compute a MT by computing $2^k$ public keys and then use them to compute the root of the tree root. root will be then sent to a CA 308 for certification. This method may simplify the public key certification process by contacting the CA 308 only once (to authenticate the root of the tree) to sign $2^k$ messages. In some embodiments, for example, the dashed lines in FIG. 3A are only executed once for every $2^k$ messages signed. Using this method, signature verification may use the servers 306 to send the authenticating path along with the final public key $(t_{c,j}, t'_{c,j})$, and therefore it incurs additional k communication overhead. Unlike other solutions, this does not imply that the scheme in the present disclosure is $2^k$ time, since after the depletion of $2^k$ public keys, a new tree (of arbitrary size) can be generated by the server 306, without the interaction of the signer 302.

In some examples, an MT-based scheme can include the following algorithms:

(MT, $pk_{root}$)←MT.Init ($x_1, \ldots, x_n$): Given n values $x_1, \ldots, x_n$, this algorithm may construct a tree of height $|n|$ with n leaves and output MT and its root $pk_{root}$.

($pk_c$, $Auth_c$)←MT.Output(c): Given the index c, this algorithm may output the leaf at location c, i.e., $pk_c$ and its corresponding authentication path $Auth_c$.

{0, 1}←MT.Verify($pk_c$, $pk_{root}$, $Auth_c$): Given the root $pk_{root}$, a leaf at location c, i.e., $pk_c$ and its alleged authentication path, this algorithm may output a decision bit {0,1}.

The example signature scheme is presented with a Merkle tree called MT-ANT in Algorithm 4. The new scheme may use an additional algorithm called MT-ANT.MTConstr that is run once (for every $2^\gamma$ signatures) among the servers to construct the MT by initiating the MT.Init algorithm. As also depicted in FIG. 3B, the servers may collaborate to compute a MT by computing $2^\gamma$ public keys and then use them to construct the tree. For certification purposes, root can then be sent to the CA for certification. This method simplifies the public key certification process by contacting the CA only once (to authenticate the root of the tree) to sign $2^\gamma$ messages. All the dashed lines in FIG. 3B are only executed once for every $2^\gamma$ messages signed. In some examples, once all the leaves are depleted, the servers, without the intervention of the signer, may generate a new tree.

Using this method, signature verification may use the servers to send the authenticating path along with the final public key $pk_c$, and therefore it may incur additional $\gamma$ communication overhead. In some examples, unlike other solutions, this might not imply that our scheme is $2^\gamma$ time since, after the depletion of $2^\gamma$ public keys, a new tree (of arbitrary size) can be generated by the server, without the interaction of the signer. One can see the direct relationship between $\gamma$ (i.e., the size of the tree) and the communication overhead between the verifier and the public key generation servers. However, since the tree generation does not require any signer intervention, if the communication bandwidth is a concern, to improve verifier communication, once can keep $\gamma$ smaller.

Here, the Runs(•) function may indicate the call of the MT-ANT.Out(c) function. In some examples, given a set of public keys, the MT-ANT.Out(c) function may build a Merkle-tree on top. The root of this Merkle-tree may allow verifier (or anyone) to make sure that the public keys returned by the servers are trusted.

---

Algorithm 4: MT-ANT: Merkle Tree Based Scheme with Certification

---

(params) ← MT-ANT.Setup ($1^k$): This algorithm is identical to the one in Algorithm 1 except,
in addition to all the parameters a parameter $\gamma$ is also selected.
(sk, c) ← MT-ANT.Kg (params): This algorithm is identical to the one in Algorithm 1.
($pk_{root}$, $cert_{root}$) ← MT-ANT.MTConstr (1, $\gamma$):
for j = 1, . . . , t do
    for c = 0, . . . , $2^\gamma$ do
        $x_{j,c}$ ← $Samp_1$ ($z_j$, c), $y_{j,c}$ ← $Samp_2$ ($z_j$, c)
        $t_{j,c}$ ← $x_{j,c}A$, $t'_{j,c}$ ← $y_{j,c}A$
        $pk_{j,c}$ ← ($t_{c,j}$, $t'_{c,j}$)
        Send $pk_{j,c}$ to other t – 1 servers
for c = 0, . . . , $2^\gamma$ do
After receiving all $pk_{j,c}$, each server computes:
$t_c = \Sigma_{j=0}^{j=t} t_{j,c}$ and $t'_c = \Sigma_{j=0}^{j=t} t'_{j,c}$
$pk_c$ ← ($t_c$, $t'_c$)
(MT, $pk_{root}$) ← MT.Init ($pk_c, \ldots, pk_{2\gamma}$)
All servers store the MT with root $pk_{root}$
Sent pkroot to the CA to obtain $cert_{root}$
All users are initialized by pkroot and $cert_{root}$
Return ($pk_{root}$, $cert_{root}$)
σ ← MT-ANT.Sig (m, sk, c): Run by the signer to issue a signature on m.
c ← c + 1
for j = 1, . . . , t do
    $sk_{j,c+1}$ ← $PRF_1$ (sk, c)
    $x_{j,c}$ ← ($sk_{j,c}$, c), $y_{j,c}$ ← $Samp_2$ ($sk_{j,c}$, c)
    $x_c$ ← $x_c + x_{j,c}$, $y_c$ ← $y_c + y_{j,c}$
z ← $x_c H_1$ (m, c) + $y_c$
return σ = (c, z)
($pk_c$, $Auth_c$) ← MT-ANT.PKConstr (c, I): This algorithm is initiated by the verifier. Given c,
the servers return the leaf $pk_c$ and the corresponding authentication path.
A server j ∈ I works as follos:
    Runs ($pk_c$, $Auth_c$) ← MT-ANT.Output (c)
return ($pk_c$, $Auth_c$)
{0,1} ← MT-ANT.Ver (m, σ, $pk_c$, $Auth_c$): Given $pk_c$ obtained from the above algorithm, the
verifier verifies the signature as follows.
if 1 ← MT-ANT.Verify ($pk_{root}$, $pk_c$, $Auth_c$) then:
    if $\|z\|_\infty \le \beta_{ver}$ then:
        Parse $pk_c$ as ($t_c$, $t'_c$)
    if $Az = t_c H_1(m, c) + t'_c$ holds then:
        return 1
    else return 0

Accountable Public Key Generation: In traditional public key infrastructure (PKI), the CA can be compromised or go rogue and issue certificates for public keys for which it knows the corresponding private key. However, this rogue behavior can be easily identified due to the existence of two certificates for two public keys for one user. A method may provide a similar accountability for servers. Therefore, here, the present disclosure introduces multiple methods to allow for an accountable public key generation process for distributed servers for ANT and ANT-FS.

To enable this for ANT, in Algorithm 5, after Step 3, every server j issues a signature $\sigma_{c,j}$ (as a commitment) on the generated public key component $(t_{c,j}, t'_{c,j})$. It then sends this signature along with the public key component to other t−1 servers. Upon receiving the pair $(t_{c,j}, t'_{c,j}, \sigma_{c,j})$, each server may first verify the signature, if verified, it may use $(t_{c,j}, t'_{c,j})$ to form the final public key $(t_{c,j}, t'_{c,j})$. Otherwise, it may alert other servers that a possible deviation from the protocol by one of the servers has occurred. The final public key may then be sent to the CA for certification. All the public key components and their corresponding signatures may be stored at the servers' side. So that any malicious attempt of servers can be detected with the help of the signer. In later there is an alleged deviation, using the secret key of the signer sk, one can regenerate any of the public keys to check if the servers honestly generate the public key components or not. Also, one can employ this accountability method to the forward secure variant ANT-FS of the schemes disclosed herein. However, since both the signer and the servers may update their keys and remove the old key, the process of identifying a cheating server for a particular signature may not be possible, even with the signer's collaboration. To address this problem, a secret sharing scheme may be employed, and the secret w among the t servers may be shared. Then, in the case of a malicious server, all servers can come together, rebuild w and identify which server potentially cheated in generating its public key components or the final public key.

---

Algorithm 5 Public Key Construction with Certification

```
(t_{c,i}, t'_{c,i}, cert) ← ConstructPK (c):
    for j = 1, . . . t do
        x_{c,j} ← Samp_1 (z_j, c), y_{c,j} ← Samp_2 (Z_j, c)
        t_{c,j} ← x_{c,j}A  t'_{c,j} ← y_{c,j}A
        pk_{j,c} ← (t_{c,j}, t'_{c,j})
        Send pk_{j,c} to other t  1 servers
    for i = 1, . . . , t, server i do
        tc ← tc + t_{c,i}, t'_c ← t'_c + t'_{c,i}
        pk_c ← (t_c, t'_c)
        Send pk_c to the CA to receive cert
    return (pk_c, c)
```

---

Security analysis: The security of ANT may be based on the fact that after seeing a signature, the value of the secret key is still information theoretically hidden from the adversary. More specifically, the security of ANT may be based on the security of its underlying onetime signature. The security of ANT may be based on the assumption that given $A \in R^{k \times l}$, it is hard to find to values z and z' where $Az=Az'$, where the operation is shown to be a collision resistance function. Therefore, in the proof, the challenger may output a random A, and the simulator may compute a secret key $[x,y]$ and output $T=[t=Ax, t'=Ay]$ as the public key. By having knowledge over the secret key, the simulator may be able to answer signature queries on message m by computing $z=xH_1(m)+y$. If the adversary then generates a new signature $z^*$ for some message m', then $Az^*=tH_1(m)+t'$, so if $z^* \neq xH_1(m)+y$ then a collision for A may be found.

Theorem 1. If there exist an adversary A that breaks the EU-CMA property (as defined in Definition 6) of ANT in Algorithm 1, then one can construct another algorithm that runs A as a subroutine and breaks the SIS problem.

Proof. In some examples, the public key servers are computational t-private. Also, the reduction algorithm B has knowledge of the private key components of the t servers (i.e., $z_1, \ldots, z_t$) secret. Therefore, given the knowledge of B of the private key components, one can see that it can simulate SGN-DPC.Sig(•) and PKConstr(•) oracles as in EU-CMA experiment (Definition 6) exactly as in the original scheme. B responds to CrptServer(i) for $i \in \{1, \ldots, t\}$ queries by returning the corresponding private key components $z_i$.

In some examples, following Definition 4, A can only initiate CrptServer(•) queries on t−1 distinct servers. Consequently, if A has knowledge on all but one server, then to guess the private key components it either has to guess the correct $z_i$ or $(x_i, y_i)$. It can come up with a correct guess with probabilities $2^{-K}$ and $2^{-ln|\beta_{xy}|}$. Therefore, without knowing at least one of the private key components pairs, the adversary may correctly compute a valid partial signature $x_i(H_1(m, c)+y_i$. The scheme described in Algorithm 1 is based on the one-time signature obtained from a Ring-SIS based one-time signature.

A theorem states that a OTS scheme is correct and secure if it meets the following properties.

Closure: $\{z \leftarrow xH_1(\bullet)+y\} \in S$ holds for all x, $y \in \beta_{xy}$ and $H_1$ as defined above, where $S=\{z \in R_t: \|z\|_\infty \le 2\beta_c\beta_{xy}\}$.

Collision Resistance: The function family $\{A:S \to R^n | A \in H\}$ is collision resistance where given A, the adversary A has only a negligible probability to output a collision ($u \neq u'$, $Au=Au'$).

$(\epsilon, \delta)$-Hiding: Given A, x, $y \in \beta_{xy}$ and $h \leftarrow H_1(m, c)$, let: $\Gamma_A(x, y, h)=\{x', y' \in \beta_{xy}: Ax=Ax' \wedge Ay=Ay' \wedge xh+y=x'h+y'$ be the set of keys that are compatible with the public key $pk=(t_c, t'_c)$ and signature $xh+y$ for h as defined above. Then the scheme is $(\epsilon, \delta)$-Hiding if $Pr_{x,y \in \beta_{xy}}[\forall h \neq h', |\Gamma_A(x, y, h) \cap \Gamma_A(x, y, h')| \le \epsilon|\Gamma_A(x, y, h)|] \ge \delta$. In the following, the hiding property is used where $\epsilon=12$ and $\delta=1$.

Lemma 1. For the function $\{Au:S \to R^n | A \in R^{l \times l}\}$ is collision resistance under the average-case Ring-SIS$_{q,n,k,l,\beta_{xy}}$ problem defined in Definition 1.

Proof. If the adversary A can find two vectors u, $u' \in S$ and $u \neq u'$ for a random $A \in R^{l \times l}$, such that $Au=Au'$, then it can find a solution to the average-case Ring-SIS$_{q,n,k,l,\beta_{xy}}$ problem since $A(u-u')=0$ and $\|u-u'\|_\infty \le 4\beta_c\beta_{xy}$.

Lemma 2. The closure property holds for the scheme proposed in Algorithm 1.

Proof. $\|xH_1(\bullet)+y\|_\infty \le \|xH_1(\bullet)\|_\infty + \|y\|_\infty \le \beta_c\beta_{xy}+\beta_c\beta_{xy}=2\beta_c\beta_{xy}$.

Lemma 3. If n, l, q and $\beta_x$ are positive integers, $R=Z[x]/(x^n+1)$ a polynomial ring and suppose that $\beta_x^{ln} > 2^K \beta_0 q^n$. Then for any $A \in R^{k \times l}$ and $c \in \beta_c$, $Pr_{x,y \leftarrow \beta_{xy}}[\exists x', y' \in \beta_{xy}: Ax=Ax' \wedge Ay=Ay' \wedge x \cdot c+y=x' \cdot c+y']=1-2^{-K}$ Proof. For any $A \in H$, the function $\{(A, c):(x, y) \in K \to (pk, z)\}$ can be considered. The domain size of this function is $|K|=\beta_{xy}^{nl} \cdot \beta_{xy}^{nl}$. By Lemma above, $z=xH_1(\bullet)+y \le 2\beta_c\beta_{xy}$. Therefore, the number of possibilities for z is (at most) $(4\beta_c\beta_{xy}+1)^{nl}$. In some examples, there are $q^{2n}$ possibilities for $pk=(t, t')$. For a fixed A, c, and signature, there are at most $((4\beta_c\beta_{xy}+1)^{nl})q^n$ possibilities for (pk, z). Therefore, the probability is $1-2^{-K}$.

Lemma 4. For $2\beta_{xy}+1 \ge q^{1/l} \cdot 2^{K/nl}$ and a large q, the scheme satisfies the (½)-Hiding property.

Proof. By the result of the previous lemma, over the random choice of x and y, for every message the size of the set $\Gamma(x, y, h)$ (for $h \leftarrow H_1(m, c)$) is at least 2 with probability $1-2^{\kappa}$. Then, for all A, x, y and h, h', the size of the set $\Gamma(x, y, h) \wedge \Gamma(x, y, h')$ is at most 1. Next, given the definition of $\Gamma(\cdot)$, $xh+y=x'h+y'$ and $xh'+y=x'h'+y'$ can be obtained These relations can be written as $(x-x')\cdot(h-h')=0$. Since $2\beta_{xy}\beta_c(n\beta_c+1)<q$ and since R is an integral domain, $x=x'$ which implies $y=y'$ can be obtained and this concludes the proof.

Therefore, based on the Lemmas above, the example scheme in Algorithm 1 is secure in the sense of Definition 6.

Lemma 5. The scheme proposed in Algorithm 2 is forward secure.

Proof. Firstly, to respond to BreakIn(c) queries for the state/period c, B outputs the full private key of the user ($x_c$, $y_c$). In some examples, this is much stronger than returning the private key components or partial signing keys. The example scheme in Algorithm 2 utilizes a hash and delete method on the seeds $z_{j,c}+1 \leftarrow H_2(z_{j,c})$ to compute new seeds for each state/period c+1 on both the signer and server's side and after the new seed is generated the old will be deleted.

Given the properties of the hash function $H_2(\cdot)$, the provided hash chain ensures that if one (or all) private key components are compromised in time period c, it would be infeasible to compute the private keys prior to state c.

Performance evaluation: This section may evaluate and compare the performance of ANT with some of its closely related counterparts.

As compared to another base scheme, the base scheme in the present disclosure significantly reduces the signer memory requirement and communication by not using the signer to store and send the public key. For instance, even if the hurdle of certificates may not be considered, the public key size for 138 bits security would be nearly 7.20 KB (for each signature) to be stored at the signer's side and be communicated with each signature. Also, for another one-time scheme, the signer may compute a vector-matrix multiplication to compute the public key for every new signature to be generated.

Various forms of an ANT approach may be implemented by utilizing the latest tools that were used some of the recent most recent lattice-based candidates in NIST's PQC standardization process. As alluded to, the NTT operation in ANT.Kg and ANT.Ver may employ Cooley-Tukey butterflies in the forward transform and Gentleman-Sande butterflies in the inverse transform on 32-bit unsigned integers. In ANT.Sig, a hash function may have exactly $\alpha$ coefficients that could be either $-1$ or $1$ with rest being $0$. $H_1$ uses SHAKE-256 to obtain a stream of random bytes which then may be converted using the inside-out variation of the Fisher-Yates shuffle to obtain an output with exactly $\alpha$ 1 s and $-1$ s.

The present disclosure may compare the performance of ANT with state-of-the-art digital signature schemes for both of these platforms, in terms of computation, storage and communication.

1) Hardware Configurations: A laptop may be equipped with Intel i7 Kaby Lake Refresh processor @ 1.90 GHz and 16 GB RAM. For the distributed public key servers, Amazon EC2 instances may be set up and equipped with an Intel Xeon E5 processor that operates at 2.4 GH, located in North Virginia.

2) Parameters & Libraries: Parameters may be set for the MSIS to be hard. Therefore, $q=2^{23}-2^{13}-1$, $n=256$ may be set. For ANT-II and for ANT-III, $D_{xy}=6$, $k=4$ and $l=3$ may be set. Also, $D_{xy}=5$, $k=5$ and $l=4$ may be set. The PRF with AES in counter mode using Intel intrinsics may be instantiated. SHAKE256 for hashing may be used. The implementation is not optimized for any specific platforms and for related counterparts, and their base reference implementations are used.

3) Experimental Results: The scheme may present the results of the experiments in Table I.

TABLE 1

Experimental performance comparison of ANT and its counterparts on a resourceful computer

| Scheme | Signing Cycles | Private Key (KB) | Signature (KB) | Verification Cycles | Public Key (KB) |
|---|---|---|---|---|---|
| Scheme A | 222,503,189 | 0.06 | 17,088 | 14,681,407 | 0.03 |
| Scheme B | 8,075,528 | 5.86 | 4.85 | 2,490,844 | 0.06 |
| Scheme C | 865,921 | 2.288 | 2.42 | 216,654 | 1.312 |
| Scheme D | 1,387,776 | 3.184 | 3.293 | 348,640 | 1.952 |
| ANT-II | 81,333 | 0.03 | 0.432 | 293,184 | 5.89 |
| ANT-III | 84,805 | 0.03 | 0.56 | 399,214 | 7.36 |

In the private key column, for scheme A, the parameters $n=16$, $h=66$, $d=22$, $b=6$, $k=33$, and $w=16$ for 128-bits security are used. In some examples, for ANT the verification cycles may not include the network delay to receive partial public keys which is around 40 ms per server in the aforementioned circumstances. Also, the public size in ANT is per-signature.

Signer Computation & Storage: ANT may provide ultra-efficient signing with post-quantum security especially for resource-limited IoT devices (e.g., a microcontroller). Therefore, the signature generation algorithm of ANT, after computing the private key (Steps 2-5 in ANT.Sig), may only use a sparse vector multiplication and one vector addition. Therefore, as depicted in Table I above, both ANT-II and ANT-III significantly outperform their hash-based counterparts. That is, the scheme in the present disclosure is significantly faster and memory-efficient on the signer's side. Comparing the signature generation of Schemes C & D with the present disclosure, firstly, since the rejection sampling step (which could use the repetition of the signing algorithm to 10×) is not necessary, any repetition of the signing algorithm may not be used. Secondly, due to the one-time nature of the scheme of the present disclosure, the scheme in the present disclosure does not need to compute a commitment in the signing which exploits a vector-matrix multiplication. These result in more than 10× faster signature generation in ANT as compared to Schemes C and D. In terms of storage and communication, ANT may only store a 32-byte seed to regenerate the private key components using the Samp functions and for signature size, ANT enjoys from more than 5.5× smaller signature size as compared to Scheme C and D. Moreover, even though explicit side-channel attacks have not been discovered, there might be the concern of such attacks. Additionally, while the matrix A does not need to be stored and can be regenerated via an "Expand" function, it still uses memory expansion at the signer side, this memory expansion is up to 14.38 KB for this matrix. Lastly, based on the analytical analysis, the signature size in other example will be nearly 1.2 KB larger than the one in a scheme for 138 bits security.

Verifier Computation & Storage: Even though ANT is designed with the focus on providing efficient signature generation, it may still enjoy from comparable with its most efficient counterpart. As asserted, for each signature to be verified, ANT can use the verifier to request public key (components) from semi-honest public key servers, and given this configuration, this communication overhead is measured to be on average around 40 ms with an EC2 instance in North Virginia. Also, as opposed to Schemes C and D, the public key storage overhead in this scheme is per signature. Given the system model in the present disclosure and performance gain on the signer, this may be a worthy trade-off.

B. Performance on Microcontrollers

1) Hardware Configurations: AVR ATmega 2560 microcontroller might be used for an exemplary low-end device since it is widely adopted in practice (especially for medical devices) due to its low power consumption. AVR ATmega 2560 is an 8 bit microcontroller with 8 KB SRAM, 256 KB flash memory, 4 KB EEPROM and maximum clock speed is 16 MHz. Of course, AVR ATmega 2560 microcontroller is a mere example to perform the tasks in the schemes of the present disclosure. It should be appreciated that any other suitable microcontroller may be used for schemes in the present disclosure.

2) Parameters & Libraries: ANT-II for deployment on 8-bit microcontrollers due to its smaller parameter sizes may be used. The counterparts are then selected with a comparable security level.

3) Experimental Results: The scheme in the present disclosure may present the results of the inventors' experiments in Table II.

communicating the public keys, the larger public key size in ANT-II may not affect the performance of the signer in any way.

Figure 4:
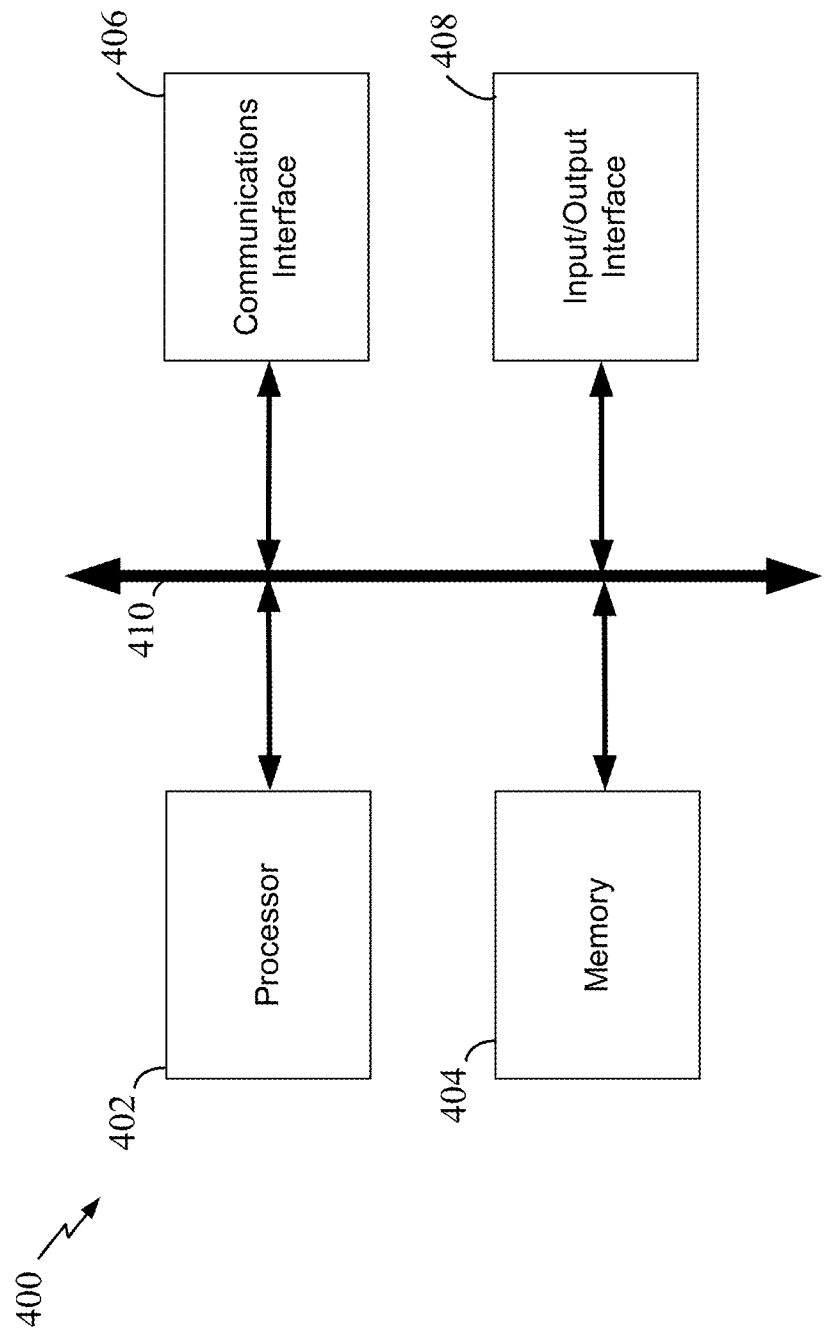
FIG. 4 is a block diagram conceptually illustrating an example of a hardware implementation for a signature generation and/or verification system according to some aspect of the disclosure.

FIG. 4 is a block diagram conceptually illustrating an example of a hardware implementation for a signer or verifier 400. The signer or verifier 400 includes a processor 402, a memory 404, a communications interface 406, and an input/output interface 408. The difference between the signer and the verifier is that the verifier may be more resourceful than the signer, as many IoT applications or signers may access the verifier. Some or all of these components may communicate over a bus 410. Although the bus 410 is illustrated here as a single bus, it may instead be implemented as one or more busses, bridges, or other communication paths used to interconnect components of the signer or verifier 400. Memory 404 may be a non-transitory computer readable storage medium (e.g., read-only memory (ROM), random access memory (RAM), flash memory, etc.). Communication interface 406 may communicate with the verifier and the signer, servers and the verifier, and/or a certification authority and the verifier. Input/output interface may receive and transmit data for a function (e.g., ANT.Kg($1^k$), ANT.Sig(m, sk), ANT.Ver(m, σ), ConstructPK(c,j), ConstructPK(c). Examples of processors 402 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. Processor 302 may execute instructions stored in memory 304 to generate a security parameter, generate at least two seeds, determine a private key, generate a signature, exploit a has function, update the private key, generating a first signature parameter, generate a second signature parameter, apply the first signature parameter to a has function, determine a full public key, authenticate the signature, and/or comparing the public key signature with the signature on the message.

Of course, in the above examples, the functions to be processed in the processor 402 are merely provided as examples, and other means for carrying out the described

TABLE II

Performance comparison of ANT and its counterparts on 8-Bit Microcontroller

| Scheme | Signing Cycles | Private Key (KB) | Signature (KB) | Public Key (KB) | Device |
|---|---|---|---|---|---|
| Scheme E | 23,211,611 | 0.03 | 0.06 | 0.03 | ATmega2560 (16 MHz) |
| Scheme E | 10,537,981 | 0.25 | 0.7 | 0.85 | ATxmega128A1 (32 MHz) |
| ANT-II | 802,487 | 0.03 | 0.432 | 5.89 | ATmega2560 (16 MHz) |

It appears that there is no 8-bit implementation of Schemes C and D available. Therefore, Scheme F is selected as a post-quantum counterpart. Schemes C-E are both on the same "Fiat-Shamir with Aborts" framework. However, Scheme E is based on NTRU (as opposed to LWE and SIS) and is known to have enjoyed from a faster signature generation than Schemes C and D. Therefore, the inventors have recognized it as a closest lattice-based counterpart. Also, ANT is compared with a widely adopted classical scheme (i.e., Scheme E). As depicted in II, ANTII signature generation is 13× and 29× faster than that in Schemes E-F, respectively. Similar to Scheme E-8 bit, ANT-II may have an optimal private key size of 32 bytes only. The signature size in ANT-II is 30% smaller than that in Scheme F. However, since the signer is not involved in computing, storing, or functions may be included within various aspects of the present disclosure, including but not limited to the instructions stored in the computer-readable storage medium 404, or any other suitable apparatus or means described in any one of the FIGS. 1-7, and utilizing, for example, the processes and/or algorithms described herein in relation to FIG. 4

Figure 5:
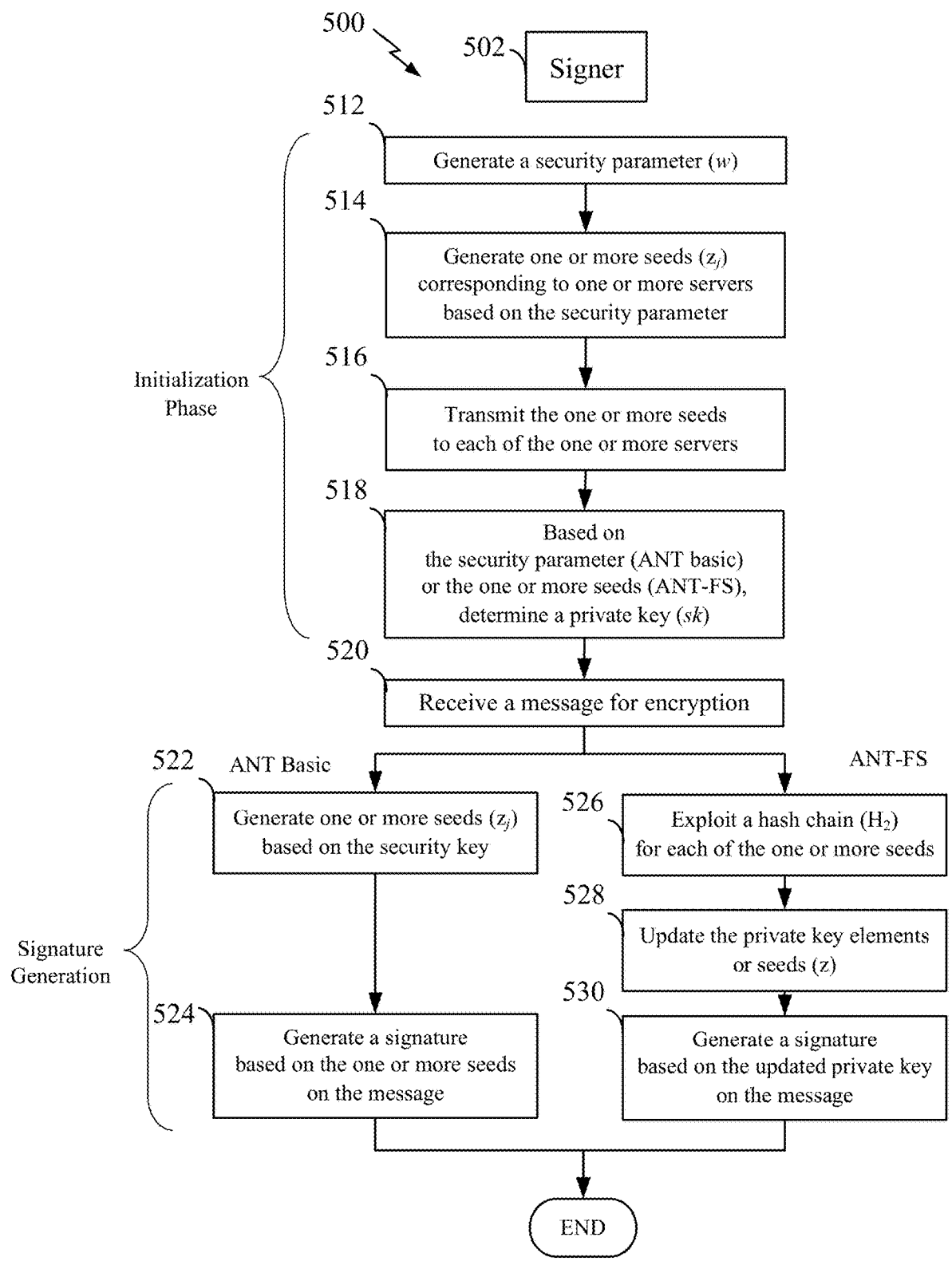
FIG. 5 is a flow chart illustrating an exemplary process for generating a signature of a signer according to some aspects of the disclosure.

FIG. 5 is a flow chart illustrating an exemplary process 500 for generating a signature of a signer 502 based on the ANT model in accordance with some aspects of the present disclosure. As described below, a particular implementation may omit some or all illustrated features, and may not require some illustrated features to implement all embodiments. In some examples, the apparatus 400 illustrated in FIG. 4 may be configured to carry out the process 500. In some examples, any suitable apparatus or means for carrying out the functions or algorithm described below may carry out the process 500.

Blocks 512-518 illustrate an initialization phase before generating a signature. In the initialization phase (Kg($1^k$)), a signer 502 may generate a signer's private key (sk) and private seeds ($\{z_1, \ldots, z_t\}$) for t servers. At block 512, after selecting security parameters p, q, l, k, t, the signer 502 may generate a security parameter (w) using $\{0,1\}^k$, $A \in \mathcal{R}^{k \times l}$. The signer 502 may also set a counter c=0.

At block 514, the signer 502 may generate at least two seeds ($\{z_1, \ldots, z_t\}$) corresponding to at least two servers based on the security parameter (w) using a pseudorandom function. For example, for each of the at least two servers, the signer 502 may generate a seed ($z_t$). This may be expressed as: for j=1, ..., t do $z_j \leftarrow PRF_1(w, j)$. The signer 502 may generate a seed for each server of the t servers using the pseudorandom function based on the security parameter (w) and the number of the server (j). Thus, the signer 502 may have the t seeds, $\{z_1, \ldots, z_t\}$. In some examples, the signer 502 may generate multiple private key components ($sk_j$) (i.e., t private key components $\{sk_1, sk_2, \ldots, sk_t\}$) corresponding to the t servers. This may be expressed as: for j=1, ..., t do $sk_j \leftarrow PRF_1(sk, j)$.

At block 516, the signer 502 may distribute the t seeds, $\{z_1, \ldots, z_t\}$ to each of the t servers. Thus, each server of the t servers may have the t seeds, $\{z_1, \ldots, z_t\}$. In some examples, the signer 502 may distribute the multiple private keys ($sk_j$) (i.e., t private keys) to each of the t servers.

At block 518, the signer 502 may determine a private key (sk) based on the security parameter for the ANT basic scheme or the at least two seeds for the ANT-FS scheme. For example, for the ANT basic scheme, the signer 502 may set the security parameter (w) as a private key (sk). Thus, in the ANT basic scheme, the private key may include a single element. If the initialization phase may be implemented as a function ((sk, params)←ANT.Kg($1^k$)) or a module to be processed with inputs and outputs, the function or module may return the security parameter (w) as a private key (sk). In addition, the function or module may also return security parameters (p, q, m, k, l, A). In some examples, the security parameters can be obtained based on a function (params)← (q, n, k, l, $\beta_{xy}$, $\beta_{ver}$, $\beta_c$, $A \in R_q^{k \times l}$) first using a setup function (e.g., (ANT.SETUP($1^K$)), and the security parameters (q, n, k, l, $\beta_{xy}$, $\beta_{ver}$, $\beta_c$, $A \in R_q^{k \times l}$) can be used as an input of the ANT.Kg function (e.g., ANT.Kg(params)). Then, based on the key generation function (e.g., ANT.Kg(params)), the signer can determine or generate the private key (sk) and the multiple private key components (e.g., private seeds, <$sk_1$, $sk_2$, ..., $sk_t$>) with the counter (c).

For the ANT-FS scheme, the signer 502 may set the t seeds ($\{z_1, \ldots, z_t\}$) as a private key (sk). Thus, in the ANT-FS scheme, the private key may include the t seeds. If the initialization phase may be implemented as a function ((sk, params)←ANT.Kg($1^{\mathcal{K}}$)) or a module to be processed with inputs and outputs, the function or module may return the t seeds ($\{z_1, \ldots, z_t\}$) as a private key (sk). In addition, the function or module may also return security parameters (p, q, m, k, l, A). The function and module may operate in the signer 502. In some examples, the signer can generate private key components ($sk_{j,c}$) using a pseudorandom function ($PRF_1(sk, j)$) based on the private key (sk) and an index (j) for a corresponding server. After generating the private key components ($sk_{j,c}$), the signer may delete the private key (sk). Then, the signer may distribute the private key components ($sk_{j,c}$) to each of the t servers. Since the signer deletes the private key (sk), the signer may just return the updated private key, which includes private key components ($\{sk_{1,c}, \ldots, sk_{t,c}\}$) and the state or counter (c).

After the initialization phase, blocks 512-518, at block 520, the signer 502 may receive a message (m) for encryption. The message (m) may be a document, picture, or any other suitable information for encryption using a signature.

To generate a signature, the signer 502 may use the ANT basic scheme or ANT-FS scheme. For the ANT basic scheme, at block 522, the signer 502 may calculate the counter as c←c+1. At block 522, the signer 502 may generate at least two seeds ($\{z_1, \ldots, z_t\}$) or security components ($\{sk_1, \ldots, sk_t\}$) based on the private security key (w or sk) using a pseudorandom function. For example, for each of the at least two servers, the signer 502 may generate a seed ($z_t$) or a security component ($sk_j$) based on the private key (w or sk). This may be expressed as: for j=1, ..., t do $z_j$ or $sk_j \leftarrow PRF_1(sk, j)$. The signer 502 may generate a seed for each server of the t servers using the pseudorandom function based on the private security key (w or sk) and the index of the corresponding server (j). Thus, the signer 502 may have the t seeds or private key components, $\{z_1, \ldots, z_t\}$ or $\{sk_1, \ldots, sk_t\}$. This step is substantially the same as the step in the initialization step. The seeds generated in Key Generation step can be pre-stored. However, in some examples, this will incur linear storage overhead to the signer. To avoid storage overhead, the seeds can be regenerated at the signer. For each server of the at least two servers t, the signer 502 may generate a pair of partial signature parameters ($x_{c,j}$, $y_{c,j}$) based on Samp functions ($Samp_1(z_j, c)$ for $x_{j,c}$ and $Samp_2(z_j, c)$ for $y_{j,c}$ or $Samp_1(sk_j, c)$ for $x_{j,c}$ and $Samp_2(sk_j, c)$ for $y_{j,c}$). The pair of partial signature parameters ($x_{c,j}$, $y_{c,j}$) may correspond to secret values using Samp functions ($Samp_1(z_j, c)$, $Samp_2(z_j, c)$ or $Samp_1(sk_j, c)$, $Samp_2(sk_j, c)$). During the signature generation, the signer 502 may generate partial signature parameters ($x_{c,j}$, $y_{c,j}$), where each correspond to a partial secret key. These partial signature parameters are then added to form the final signature (σ). The Samp function may be considered a special random number generator which select a random vector from a particular domain. For example, the Samp function may sample a vector from a particular distribution where the vector may form a secret key. Based on the pair of partial signature parameters for each server of the at least two servers t, the signer may generate a cumulative pair of partial signatures ($x_c$, $y_c$). That is, for each server (j) of the at least two servers t, the signer 502 may generate the cumulative pair of partial signatures ($x_c$, $y_c$) based on the pair of partial signature parameters ($x_{c,j}$, $y_{c,j}$) and the current cumulative pair of partial signatures ($x_c$, $y_c$). This may be expressed as: for j=1, ..., t do $x_c \leftarrow x_c + x_{c,j}$, $y_c \leftarrow y_c + y_{c,j}$.

At block 524, the signer 502 may generate a signature (σ) based on the at least two seeds or private key components for one the message (m). In particular, the signer 502 may generate a signature (σ) based on the cumulative pair of partial signatures ($x_c$, $y_c$) which is generated by the at least two seeds or private key components ($\{z_1, \ldots, z_t\}$ or $\{sk_1, \ldots, sk_t\}$). The signer 502 may generate a vector (z) based on a first partial signature ($x_c$) multiplied with a hashed result ($H_1(m, c)$) and a second partial signature ($y_c$). The hash function ($H_1(m, c)$) may be a cryptographic hash function to map arbitrary length messages to the message space $\mathcal{M}$ with vectors with exactly $\mathcal{D}_c$ number of 1 or −1 with the rest of the elements being 0. This may be expressed as: $z \leftarrow x_c H_1(m, c) + y_c$. Based on the vector (z) and the counter (c), the signer 502 may generate the signature (σ).

This may be expressed as: σ=(c, z). If the signature generation phase may be implemented as a function (σ←ANT.Sig (m, sk)) or a module to be processed with inputs and outputs, the function or module may return the vector (z) and the counter (c) as a signature (σ).

For the ANT-FS scheme, at block 526, the signer may employ a hash chain ($H_2$) for each of the at least two seeds or private key components ($\{z_1, \ldots, z_t\}$ or $\{sk_1, \ldots, sk_t\}$). For the ANT-FS scheme, the signer may calculate the counter as c←c+1. For each server of the at least two servers t, the signer 502 may generate a pair of partial signature parameters ($x_{c,j}$, $y_{c,j}$) based on Samp functions ($Samp_1(z_j, c)$, $Samp_2(z_j, c)$) or ($Samp_1(sk_j, c)$, $Samp_2(sk_j, c)$). Based on the pair of partial signature parameters for each server of the at least two servers t, the signer may generate a cumulative pair of partial signatures ($x_c$, $y_c$). That is, for each server (j) of the at least two servers (t), the signer 502 may generate the cumulative pair of partial signatures ($x_c$, $y_c$) based on the pair of partial signature parameters ($x_{c,j}$, $y_{c,j}$) and the current cumulative pair of partial signatures ($x_c$, $y_c$). This may be expressed as: for j=1, . . . , t do $x_c \leftarrow x_c + x_{c,j}$, $y_c \leftarrow y_c + y_{c,j}$.

At block 528, for each server (j) of the at least two servers (t), the signer 502 may update private key elements or private key (z). The signer 502 may calculate a new seed ($z_{j,c+1}$) with a hash claim ($H_2(z_{j,c})$) along with the seed with the current counter value (c) for a server (j) of the at least two servers (t). Then, the signer 502 may delete the seed or private key component ($z_{j,c}$ or $sk_{j,c}$) with the current counter value (c). This may be expressed as: for j=1, . . . , t do $\{z_{j,c+1} \leftarrow H_2(z_{j,c})$; delete $z_{j,c}\}$.

At block 530, based on the calculated new seeds ($z_{j,c+1}$), the signer 502 may update the private key (sk) or ($z_{j,c+1}$). The signer 502 may generate a vector (z) based on a first partial signature ($x_c$) multiplied with a hashed result ($H_1(m, c)$) and a second partial signature ($y_c$). This may be expressed as: $z \leftarrow x_c H_1(m, c) + y_c$.

At block 530, based on the vector (z) and the counter (c), the signer 502 may generate the signature (σ). This may be expressed as: σ=(c, z). If the signature generation phase may be implemented as a function (σ←ANT.Sig(m, sk)) or a module to be processed with inputs and outputs, the function or module may return the vector (z) and the counter (c) as a signature (σ).

Figure 6:
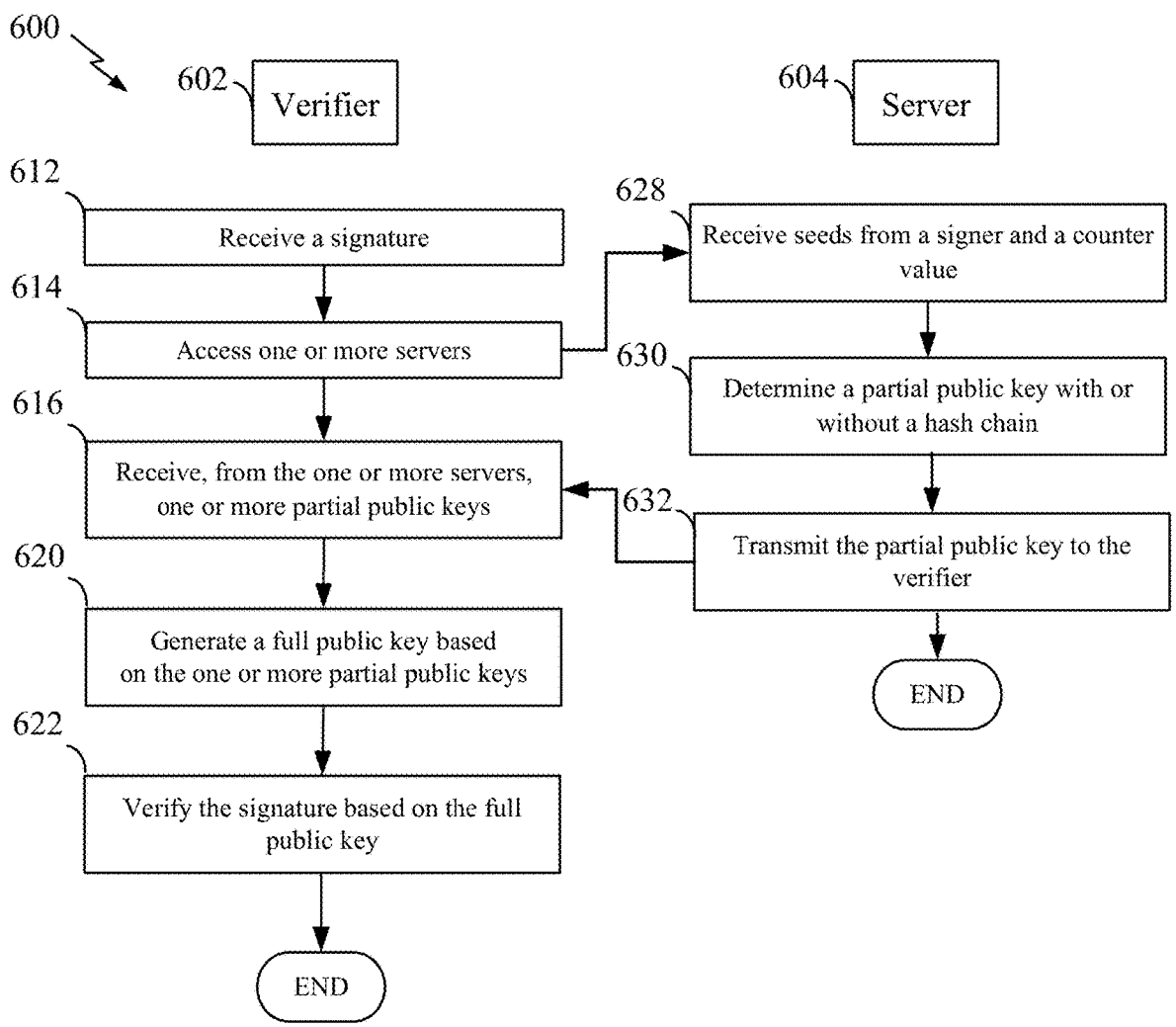
FIG. 6 is a flow chart illustrating an example process for verifying a signature with an interactive protocol between a verifier and a plurality of servers according to some aspects of the disclosure.

FIG. 6 is a flow chart illustrating an exemplary process 600 for verifying a signature with an interactive protocol between the verifier 602 and the t servers 604 in accordance with some aspects of the present disclosure. As described below, a particular implementation may omit some or all illustrated features, and may not require some illustrated features to implement all embodiments. In some examples, the apparatus 400 illustrated in FIG. 4 may be configured to carry out the process 600. In some examples, any suitable apparatus or means for carrying out the functions or algorithm described below may carry out the process 600.

At block 612, a verifier 602 may receive a signature (σ) to verify. The signature (σ) may include a vector seed (z) and a counter value (c).

At blocks 614 and 616, the verifier 604 may access the at least two servers (t) and receive at least two partial public keys ($t_{c,j}$, $t'_{c,j}$) from the corresponding at least two servers. This may be expressed as: for j=1, . . . , t do ($t_{c,j}$, $t'_{c,j}$) ←ConstructPK(c,j). Each server may perform a public key construction function (ConstructPK(c,j)) to produce partial public keys ($pk_{j,c} \leftarrow (t_{c,j}, t'_{c,j})$).

At block 628, each server of the at least two servers 604 may receive at least two seeds corresponding to the at least two servers from the signer at the initialization phase. In addition, the at least two servers 604 may receive a counter value from the verifier 602 when the verifier call the verification function (ConstructPK(c,j) or PKConstr(c,j)).

For the ANT basic scheme, for each server of the at least two servers t 604, the signer 502 may generate a pair of partial signature parameters ($x_{c,j}$, $y_{c,j}$) based on Samp functions ($Samp_1(z_j, c)$, $Samp_2(z_j, c)$). At block 630, based on the pair of partial signature parameters for each server of the at least two servers t and the vector A, the signer may generate a pair of partial public keys ($t_{c,j}$, $t'_{c,j}$). This may be expressed as: for j=1, . . . , t do $t_{c,j} \leftarrow x_{c,j} A$, $t'_{c,j} \leftarrow y_{c,j} A$. At block 632, the partial public keys ($pk_{j,c} \leftarrow (t_{c,j}, t'_{c,j})$) may be returned to the verifier 602. For the ANT-FS scheme, the counter value (c) may be updated before accessing the at least two servers. For example, this can be expressed as: c←c+1. For each server of the at least two servers (t) 604, the signer 502 may generate a pair of partial signature parameters ($x_{c,j}$, $y_{c,j}$) based on Samp functions ($Samp_1(z_j, c)$, $Samp_2(z_j, c)$). At block 630, based on the pair of partial signature parameters for each server of the at least two servers (t) and the vector A, the signer may generate a pair of partial public keys ($t_{c,j}$, $t'_{c,j}$). This may be expressed as: for j=1, . . . , t do $t_{c,j} \leftarrow x_{c,j} A$, $t'_{c,j} \leftarrow y_{c,j} A$. In addition, the seed may be updated using a hash chain ($z_{j,c+1} \leftarrow H_2(z_{j,c})$). At block 632, the partial public keys ($pk_{j,c} \leftarrow (t_{c,j}, t'_{c,j})$) may be returned to the verifier 602.

At block 620, the verifier 602 may generate a full public key ($t_c$, $t'_c$) based on the at least two partial public keys ($t_{c,j}$, $t'_{c,j}$). The full public key ($t_c$, $t'_c$) may be obtained by cumulative public key with a partial public key ($t_{c,j}$, $t'_{c,j}$). This may be expressed as: for j=1, . . . , t do $t_c \leftarrow t_c + t_{c,j}$, $t'_c \leftarrow t'_c + t'_{c,j}$.

At block 622, the verifier 602 may verify the signature based on the full public key. For example, the verifier 602 may generate a public key signature based on a hash function and the full public key ($t_c$, $t'_c$). The verifier 602 may generate a public key signature based on a first full public signature ($t_c$) multiplied with a hashed result ($H_1(m, c)$) and a second full public signature ($t'_c$). This may be expressed as: $t_c H_1(m, c) + t'_c$. The verifier 602 may compare the public key signature ($t_c H_1(m, c) + t'_c$) with the signature (σ) received from the signer. In particular, the verifier 602 may compare the public key signature ($t_c H_1(m, c) + t'_c$) with the vector seed (z) multiplied with the vector A which received from the signer at the initialization phase. The verifier 602 may determine authentication of the signature (σ) with the comparison result at block 624. If the signature generation phase may be implemented as a function (σ←ANT.Ver(m, σ) or σ←ANT.Ver(m, σ, $pk_c$)) or a module to be processed with inputs and outputs, the function or module may return 1 if the signature received from the signer is authenticated, or return 0 if not authenticated.

Figure 7:
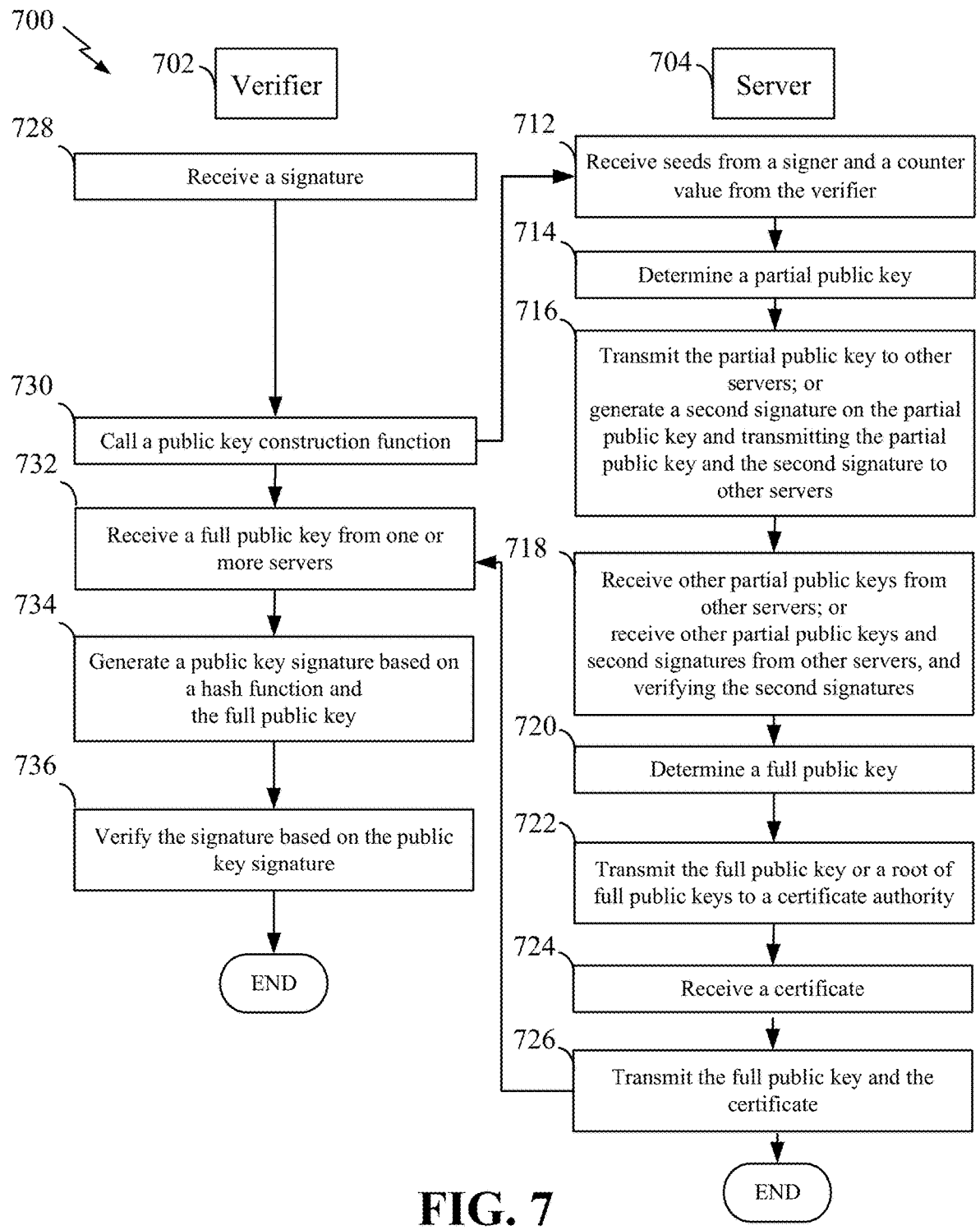
FIG. 7 is a flow chart illustrating an exemplary process for employing a system of an interactive protocol between a verifier and a plurality of servers for public key construction with certification according to some aspects of the disclosure.

FIG. 7 is a flow chart illustrating an exemplary process 700 for a system of an interactive protocol between the verifier 702 and the t servers 704 for public key construction with certification in accordance with some aspects of the present disclosure. As described below, a particular implementation may omit some or all illustrated features, and may not require some illustrated features to implement all embodiments.

Steps at the t servers 702 to provide full public keys to the verifier may be performed before a message to be encrypted on the signer and/or the signature on the message on the verifier 702. Thus, the at least two servers 704 may preprocess the full public keys before the signer receives a message for encryption and/or the verifier 702 receives a signature on the message. The verification steps may vary for the ANT basic scheme and the ANT-FS scheme.

At block 728, the verifier 702 may receive a signature from the signer with a counter value. At block 730, the verifier 702 may call a public key construction function to access the at least two servers 704 to receive a public key with certification. In addition, the at least two servers may receive a counter value from the verifier 702 when the verifier call a construction function (ConstructPK(c) or PKConstr(c)). In addition, each server of the at least two servers 704 may receive at least two seeds corresponding to the at least two servers from the signer at the initialization phase. In addition, each of the at least two servers may receive a counter value from the verifier 702 when the verifier calls the verification function (ConstructPK(c,j) or PKConstr(c)).

At block 714, the at least two servers 704 may determine partial public keys. Each server (j) of the at least two servers t 604 may generate a pair of partial signature parameters $(x_{c,j}, y_{c,j})$ based on Samp functions ($Samp_1(z_j, c)$, $Samp_2(z_j, c)$ or $Samp_1(sk_j, c)$, $Samp_2(sk_j, c)$). Based on the pair of partial signature parameters for each server of the at least two servers t and the vector A, each server may generate a pair of partial public keys $(t_{c,j}, t'_{c,j})$. This may be expressed as: for $j=1, \ldots, t$ do $t_{c,j} \leftarrow x_{c,j}A$, $t'_{c,j} \leftarrow y_{c,j}A$.

At block 716, in some examples like the individual public key certification, a server of the at least two 704 may transmit the partial public key ($pk_{j,c} \leftarrow (t_{c,j}, t'_{c,j})$) to other servers of the at least two servers 704. In other examples like the batch certification with Merkle Tree, based on the partial public key and private key (sk), a server of the at least two servers 704 may produce a signature ($\sigma_{c,j}$) using the Sig function. This may be expressed as: $\sigma_{c,j} \leftarrow Sig(t_{c,j}, t'_{c,j}, sk_j)$. The server may transmit partial public key and the signature $((t_{c,j}, t'_{c,j}, \sigma_{c,j})$ to other servers of the at least two servers 704.

At block 718, the at least two servers 704 may receive other partial public keys from other servers of the at least two servers 704. In some examples like the batch certification with Merkle Tree, the at least two servers 704 may receive other partial public keys with other signatures from other servers of the at least two servers 704. The at least two servers 704 may verify the signature with public key and store the result of the verification. This may be expressed as: for $i=1, \ldots, t$, server i do $\{d_i \leftarrow Ver(t_{c,j}, t'_{c,j}, \sigma_{c,j}, pk_j); if d_i=0$ then return (invalid, j); Store$\}$.

At block 720, the at least two servers 704 may determine a full public key $(t_c, t'_c)$ or $pk_c$. The at least two servers 704 may generate a full public key $(t_c, t'_c)$ or $pk_c$ based on the at least two partial public keys $(t_{c,i}, t'_{c,i})$. The full public key $(t_c, t'_c)$ may be obtained by cumulative public key with a partial public key $(t_{c,i}, t'_{c,i})$. This may be expressed as: for $i=1, \ldots, t$ do $t_c \leftarrow t_c+t_{c,i}$, $t'_c \leftarrow t'_c+t'_{c,i}$.

At block 722, the at least two servers may send the full public key (e.g., $(t_c, t'_c)$ or $pk_c$) or a root public key ($pk_{root}$) of full public keys (batch certification with Merkle Tree) to a certificate authority (CA).

At block 724, the at least two servers 704 may receive a certificate from the CA. At block 726, the at least two servers 704 may return the full public key with the certificate to the verifier 702.

Steps 732-736 may only apply to some examples for individual public key certification because examples for batch certification with Merkle Tree already may perform verification steps at the at least two servers. The steps 732-736 may be substantially the same as the steps 614-622.

Figure 8:
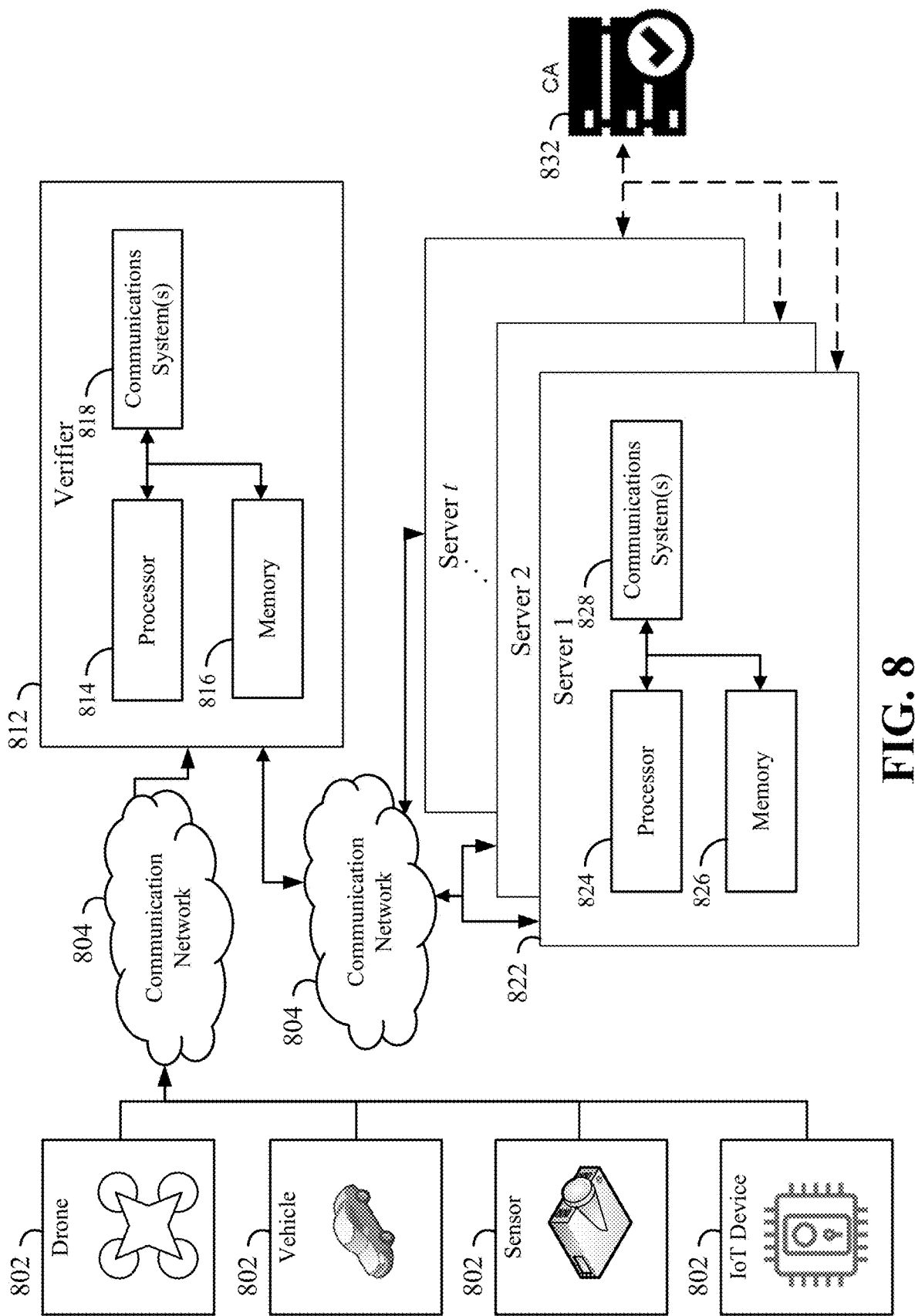
FIG. 8 is an example of hardware that can be used to implement one or more methods, shown in FIGS. 5-7 according to some aspects of the disclosure.

FIG. 8 is an example of hardware that can be used to implement one or more methods, shown in FIGS. 5-7 according to some aspects of the disclosure. As shown in FIG. 8, in some embodiments, one or more signers 802 may be any suitable devices. For example, a signer 802 may be end-user devices, sensors, drones, IoT devices, vehicles, communication devices, computing devices, industrial equipment, retail/purchasing devices, medical devices, or AI-enabled devices. However, it should be appreciated that the signer is not limited to a low-end device or resource limited device. The signer 802 may be a high-end or a resourceful device. In addition, the signer 802 may include a processor and a memory to generate a private key and/or a signature for security information or a message. The signer 802 may transmit a signature for a message to a verifier 812 via a communication network 804.

In some embodiments, a communication network 804 can be any suitable communication network or combination of communication networks. For example, communication network 804 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 804 can be a local area network, a wide area network, a public network (e.g., the Internet), a private or semi-private network (e.g., a corporate or university intranet), any other suitable type of network, or any suitable combination of networks. Communications links between the signer(s) 802 and the verifier 812 can each be any suitable communications link or combination of communications links, such as wired links, fiber optic links, Wi-Fi links, Bluetooth links, cellular links, etc.

In further examples, the verifier 812 may receive the signature from the signer(s) 802 and verify the signature based on public key(s) from server(s) 808. The verifier 812 may include a processor 814, a memory 816, and/or one or more communication systems 818. In some embodiments, processor 814 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), etc.

In some embodiments, the memory 816 can include any suitable storage device or devices that can be used to store signature(s), public key(s), data, instructions, values, etc., that can be used, for example, by the processor 814 to perform a signature verification task, to access one or more servers to provide seeds or private key components, to transmit seeds or private key components, to communicate with the one or more servers 822 via communications system(s) 804, etc. The memory 816 can include any suitable volatile memory, non-volatile memory, storage, or any suitable combination thereof. For example, the memory 816 can include random access memory (RAM), read-only memory (ROM), electronically-erasable programmable read-only memory (EEPROM), one or more flash drives, one or more hard disks, one or more solid state drives, one or more optical drives, etc.

In some embodiments, one or more communications systems 818 can include any suitable hardware, firmware, and/or software for communicating information over communication network 804 and/or any other suitable communication networks. For example, communications systems 818 can include one or more transceivers, one or more communication chips and/or chip sets, etc. In a more particular example, communications systems 808 can include hardware, firmware and/or software that can be used to establish a Wi-Fi connection, a Bluetooth connection, a cellular connection, an Ethernet connection, etc.

In further embodiments, the verifier 812 may further include a display that may include any suitable display devices, such as a computer monitor, a touchscreen, a television, an infotainment screen, etc. In even further embodiments, the verifier 812 may further include inputs that may include any suitable input devices and/or sensors that can be used to receive user input, such as a keyboard, a mouse, a touchscreen, a microphone, etc.

In some embodiments, the server 822 can include a processor 824, a memory 826, and/or one or more communication systems 828. Each of the server(s) 812 (e.g., t servers) may receive private key components or seeds from the verifier 812 via the communication network 804. The server can determine a partial public key with/without a hash chain and transmit the partial public key to the verifier 812. The functions of the processor 824, the memory 826, and/or the one or more communication systems 828 may be substantially similar to those of the processor 814, the memory 816, and/or the one or more communication systems 818 of the verifier. In some embodiment, the server 822 may communicate with a certification authority 832 to provide public key certification. Then, the server may transmit the public key or the partial public key to the verifier with the certification result from the certification authority. Since each of the servers 822 (e.g., t servers) sends a partial public key ($pk_c$), the verifier 812 determines a verification result of the signature from the signer 802 based on the multiple partial public keys corresponding to the multiple servers 822.

The example schemes are signer-efficient or lightweight signature schemes such that the example schemes provide computation and energy-efficient signing with compact signatures. Thus, the signers of the example schemes may be suitable for resource-limited devices. For example, this example schemes can be used for sensors in a smart grid, smart airport or smart city, which uses numerous homogeneous or heterogeneous sensors which rely on battery. Other alternative implementations may include networks in which drones or other autonomous operators need real-time or near-real-time authentication. Thus, the example lightweight signature schemes would be effective for long-term use of the devices without changing or charging battery. In some examples, the example schemes may be used in mission critical devices or real-time devices. The verifier 812 may store the public key(s) from the servers 822 before receiving the signature from the signer 802. Then, the verifier 812 may verify the signature substantially at the same time as the time the verifier 812 receives the signature from the signer 802. The applications of the example schemes are not limited to the listed industrial fields. For example, the example schemes can be used in a banking system which requires long term security. Since the example schemes are compatible with quantum computers or devices while most of the existing security measures are not, the banking system using the example schemes can enjoy long term security without changing any signing security systems in the approaching quantum computing era. Furthermore, the example schemes can be used in medical devices, autonomous vehicles, drones, or any other suitable devices.

This disclosure presents several aspects for generating and/or verifying a signature on a message based on the ANT schemes in the present disclosure with reference to an exemplary implementation. As those skilled in the art will readily appreciate, various aspects described throughout this disclosure may be extended to other systems, apparatuses, and modules.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The present disclosure uses the term "coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-7 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged.

What is claimed is:

1. A method for lightweight post-quantum authentication comprising:
   receiving a message at a signer device;
   generating a security parameter;
   generating a number of seeds associated with the signer device, the number of seeds being at least two seeds and corresponding in number to a set of at least two servers, based on the security parameter;
   transmitting the at least two seeds to each server of the at least two servers;
   determining via the signer device a private key based on the security parameter or the at least two seeds, the private key corresponding to a public key generated in a distributed manner by the at least two servers based on the at least two seeds; and
   generating, via the signer device, on the message, a signature based on the private key.

2. The method of claim 1, wherein the generating at least two seeds is further based on a pseudorandom function.

3. The method of claim 1, wherein the determining of the private key is based on the at least two seeds without regenerating the at least two seeds.

4. The method of claim 1, wherein the determining of the private key is based on the at least two seeds,
wherein the method further comprises:
exploiting a hash function for each of the at least two seeds; and
updating the private key based on the hash function, and
wherein the generating of the signature is based on the updated private key.

5. The method of claim 4, wherein the hash function comprises a hash chain.

6. The method of claim 1, wherein the generating of the signature comprises:
generating a first signature parameter based on a first sampling function and the at least two seeds;
generating a second signature parameter based on a second sampling function and the at least two seeds;
applying the first signature parameter to a hash function; and
generating the signature based on the applied first signature parameter and the second signature parameter.

7. A method for lightweight post-quantum authentication comprising:
receiving, from a signer device, a signature on a message;
accessing at least two servers;
obtaining, from the at least two servers, at least two partial public keys, the at least two partial public keys comprising a first partial public key parameter and a second partial public key parameter, wherein the at least two partial public keys are generated by the at least two servers distinct from the signer device;
determining a full public key based on the at least two partial public keys; and
authenticating the signature on the message based on the full public key.

8. The method of claim 7, wherein the at least two partial public keys correspond in number to the at least two servers.

9. The method of claim 8, the at least two partial public keys are based on at least two seeds of each of the at least two servers.

10. The method of claim 8, wherein each of the at least two partial public keys comprises a first partial public key parameter and a second partial public key parameter.

11. The method of claim 10, wherein the full public key comprises:
a first full public key parameter based on the respective first partial public key parameter of each of the at least two partial public keys; and
a second full public key parameter based on the respective second partial public key parameter of each of the at least two partial public keys.

12. The method of claim 11, wherein the authenticating of the signature comprises:
applying the first full public key parameter to a hash function;
generating a public key signature by adding the applied first full public key parameter and the second full public key parameter;
comparing the public key signature with the signature on the message; and
determining authentication of the signature on the message.

13. A method comprising:
receiving, on a first server, a number of seeds from a signer, the number of seeds being at least two;
determining, on the first server, a first partial public key;
transmitting, from the first server, the partial public key to at least two second servers, the at least two second servers with the first server corresponding in number to the number of seeds;
receiving, on the first server, at least two second partial public keys from the at least two second servers;
determining, on the first server, a full public key based on the first partial public key and the at least two second partial public keys;
receiving, on a verifier, a signature on a message;
receiving, on the verifier, the full public key and a certificate; and
authenticating, on the verifier, the signature on the message based on the full public key.

14. The method of claim 13, further comprising:
transmitting, from the first server, the full public key to a certificate authority;
receiving, on the first server, the certificate from the certificate authority; and
transmitting, from the first server, the certificate and the full public key to the verifier.

15. The method of claim 13, further comprising:
determining a root of at least two public keys corresponding to the first server and the at least two second servers;
transmitting, from the first server, the root to a certificate authority;
receiving, on the first server, the certificate from the certificate authority; and
transmitting, from the first server, the certificate and the full public key to the verifier.

16. The method of claim 13, wherein the full public key comprises a first full public key parameter and a second full public key parameter,
wherein the authenticating of the signature comprises:
applying the first full public key parameter to a hash function;
generating a public key signature by adding the applied first full public key parameter and the second full public key parameter;
comparing the public key signature with the signature on the message; and
determining authentication of the signature on the message.

17. The method of claim 13, further comprising:
generating, on the first server, a second signature on the partial public key,
wherein the transmitting of the partial public key comprises: transmitting, from the first server, the partial public key and the second signature to the at least two second servers, and
wherein the receiving the at least two partial public keys comprises: receiving, on the first server, the at least two partial public keys and at least two second signatures from corresponding at least two second servers.

18. The method of claim 17, further comprising:
verifying the at least two second signatures corresponding to the at least two partial public keys.

* * * * *